US012418694B2

(12) United States Patent
Kwon et al.

(10) Patent No.: US 12,418,694 B2
(45) Date of Patent: Sep. 16, 2025

(54) METHOD FOR CONTROLLING SOUND OUTPUT OF AUDIO REPRODUCING DEVICE AND ELECTRONIC DEVICE PERFORMING THE SAME

(71) Applicant: SAMSUNG ELECTRONICS CO., LTD., Suwon-si (KR)

(72) Inventors: Jihye Kwon, Suwon-si (KR); Youngchan Woo, Suwon-si (KR); Joayoung Lee, Suwon-si (KR); Insik Myung, Suwon-si (KR); Miyoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 103 days.

(21) Appl. No.: 18/219,219

(22) Filed: Jul. 7, 2023

(65) Prior Publication Data

US 2024/0137605 A1 Apr. 25, 2024
US 2024/0236408 A9 Jul. 11, 2024

Related U.S. Application Data

(63) Continuation of application No. PCT/KR2023/008673, filed on Jun. 22, 2023.

(30) Foreign Application Priority Data

Oct. 21, 2022 (KR) .................. 10-2022-0136466

(51) Int. Cl.
*H04N 21/439* (2011.01)
*H04N 21/442* (2011.01)

(52) U.S. Cl.
CPC ..... *H04N 21/439* (2013.01); *H04N 21/44213* (2013.01)

(58) Field of Classification Search
CPC .......... H04N 21/439; H04N 21/44213; H04R 5/04; H04R 3/12; H04R 2410/01;
(Continued)

(56) References Cited

U.S. PATENT DOCUMENTS 9,398,367 B1 7/2016 Scott et al.
9,812,168 B2 11/2017 Kim et al.
(Continued)

FOREIGN PATENT DOCUMENTS

CN 114885440 8/2022
EP 3451692 B1 * 9/2020 ............. G06F 3/165
(Continued)

OTHER PUBLICATIONS

International Search Report dated Oct. 4, 2023 in Application No. PCT/KR2023/008673.
(Continued)

*Primary Examiner* — Chenea Davis
(74) *Attorney, Agent, or Firm* — STAAS & HALSEY LLP

(57) ABSTRACT

A method of controlling a sound output of a first audio reproducing device that is operable in a simultaneous listening mode with a second audio reproducing device such that, in the simultaneous listening mode, each of the first audio reproducing device and the second audio reproducing device operate to output content sound based on an audio content signal streamed from a corresponding content providing device through a communication connection, according to their respective sound output settings, the method including detecting a conversation request from the second audio reproducing device; controlling the first audio reproducing device to exit the simultaneous listening mode, enter a conversation mode, and change the sound output setting of the first audio reproducing device, in response to detecting (Continued)

the conversation request; and controlling the first audio reproducing device to output the content sound based on the changed sound output setting while operating in the conversation mode.

20 Claims, 27 Drawing Sheets

(58) Field of Classification Search
CPC ............ H04R 2430/01; H04R 2460/01; G06F 3/017; G06F 3/041; G06F 3/14; G06F 3/165
See application file for complete search history.

(56) References Cited

U.S. PATENT DOCUMENTS

| | | | |
|---|---|---|---|
| 10,299,300 | B1 | 5/2019 | Young |
| 11,233,836 | B2 | 1/2022 | Fornshell et al. |
| 11,375,560 | B2 | 6/2022 | Andersen et al. |
| 11,418,874 | B2 | 8/2022 | Kirsch et al. |
| 12,131,748 | B2 | 10/2024 | Salahuddin et al. |
| 2005/0245317 | A1* | 11/2005 | Arthur .................... A63F 13/12 463/42 |
| 2014/0126736 | A1* | 5/2014 | Gauger, Jr. ...... G10K 11/17837 381/71.6 |
| 2015/0296061 | A1 | 10/2015 | Geiger et al. |
| 2016/0255436 | A1* | 9/2016 | Kirsch .................... H03G 3/32 381/309 |
| 2022/0053270 | A1* | 2/2022 | Ko ......................... H04W 4/38 |

FOREIGN PATENT DOCUMENTS

| | | | | |
|---|---|---|---|---|
| EP | 3629145 | B1 * | 12/2022 | ............ G06F 3/165 |
| JP | 2001-119776 | | 4/2001 | |
| JP | 2018-512754 | | 5/2018 | |
| KR | 10-2010-0044380 | | 4/2010 | |
| KR | 10-2016-0100767 | | 8/2016 | |
| KR | 10-2020-0113058 | | 10/2020 | |
| KR | 10-2021-0032474 | A | 3/2021 | |
| KR | 10-2357300 | B1 | 1/2022 | |
| KR | 10-2022-0016544 | A | 2/2022 | |
| KR | 10-2022-0020185 | | 2/2022 | |
| KR | 10-2022-0020185 | A | 2/2022 | |
| KR | 10-2022-0038823 | A | 3/2022 | |
| KR | 10-2376183 | B1 | 3/2022 | |
| KR | 10-2022-0061537 | A | 5/2022 | |
| KR | 10-2022-0084902 | | 6/2022 | |
| WO | 2020/068593 | A1 | 4/2020 | |
| WO | 2020/242589 | A1 | 12/2020 | |

OTHER PUBLICATIONS

Written Opinion dated Oct. 4, 2023 in Application No. PCT/KR2023/008673.

* cited by examiner

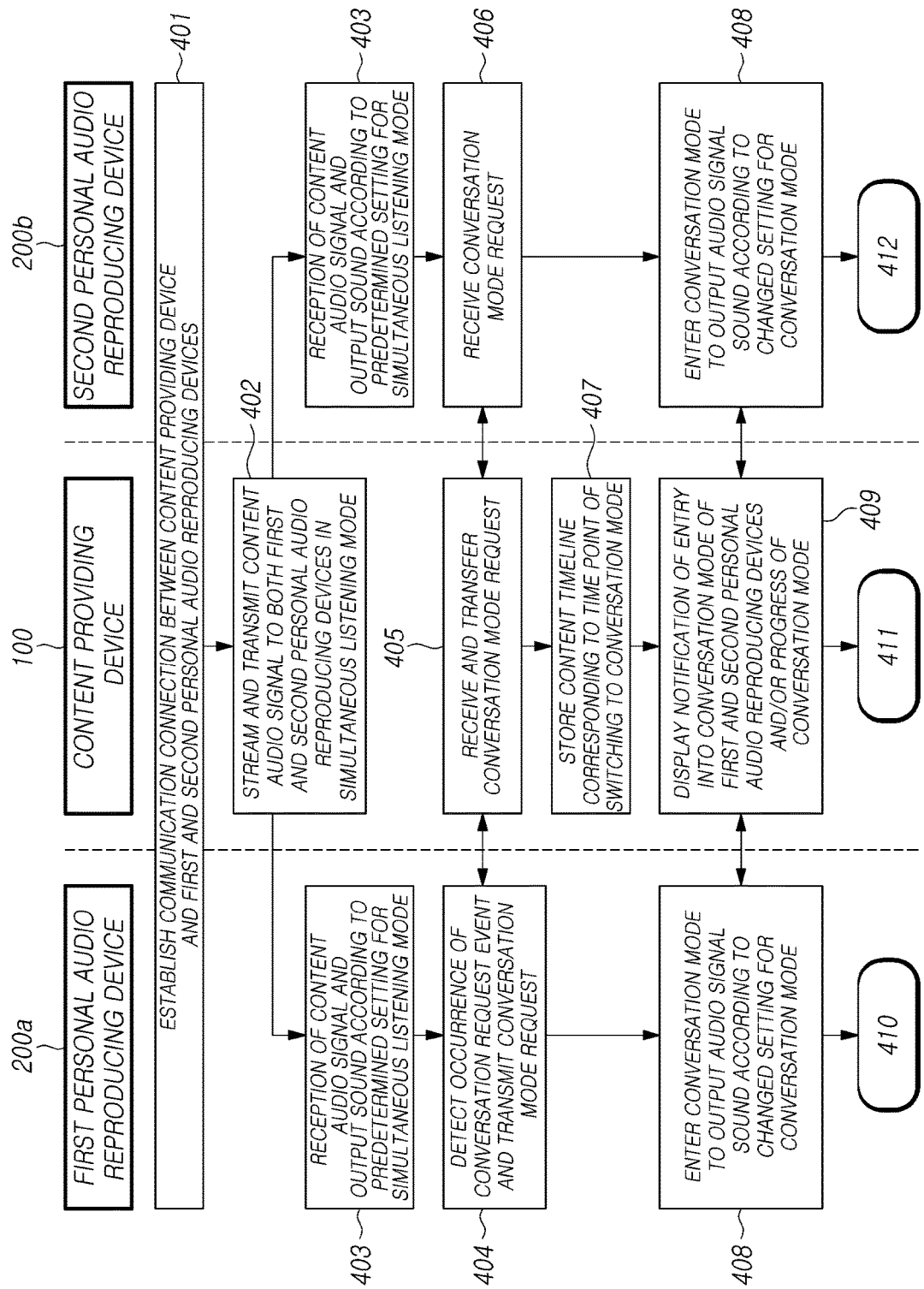

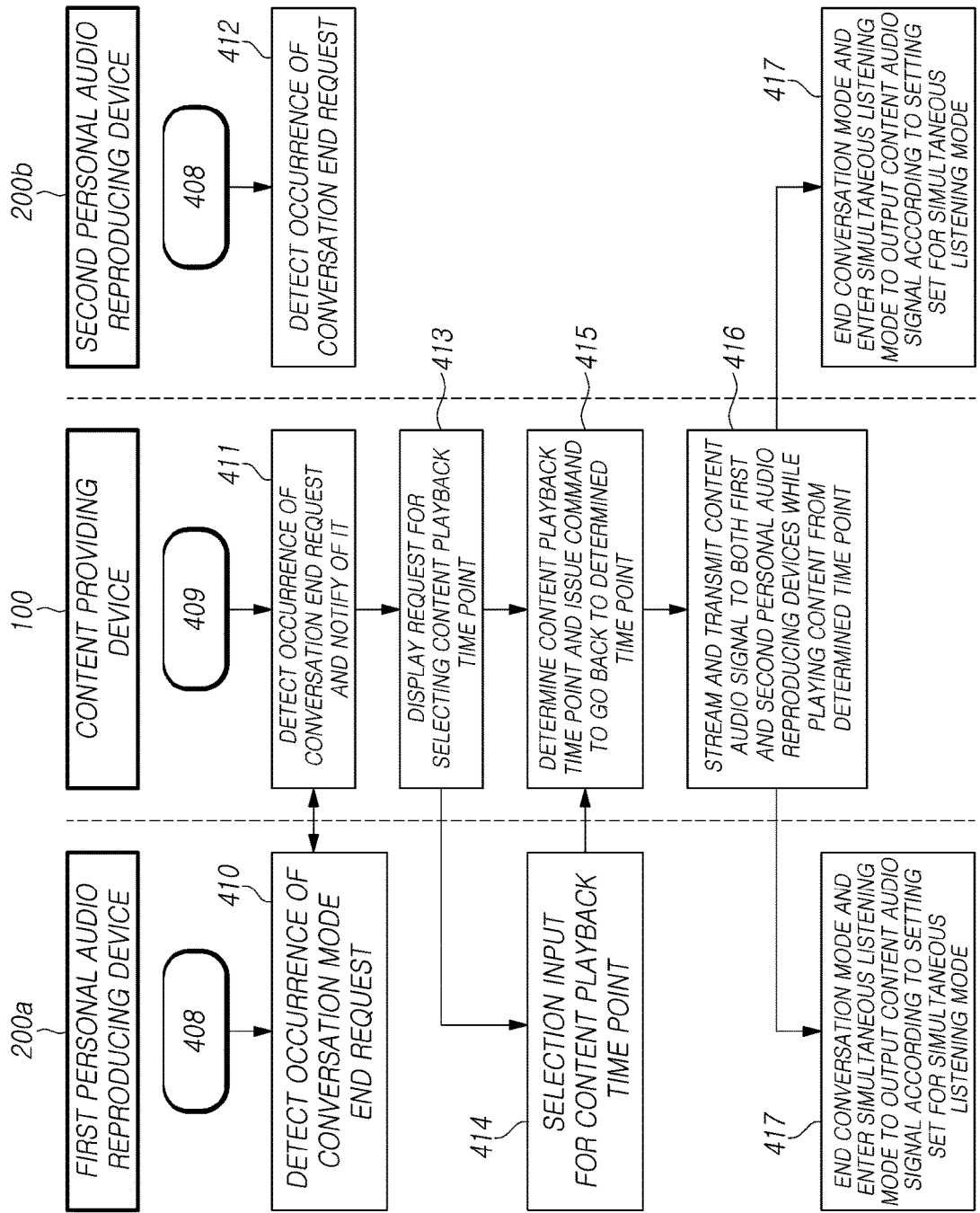

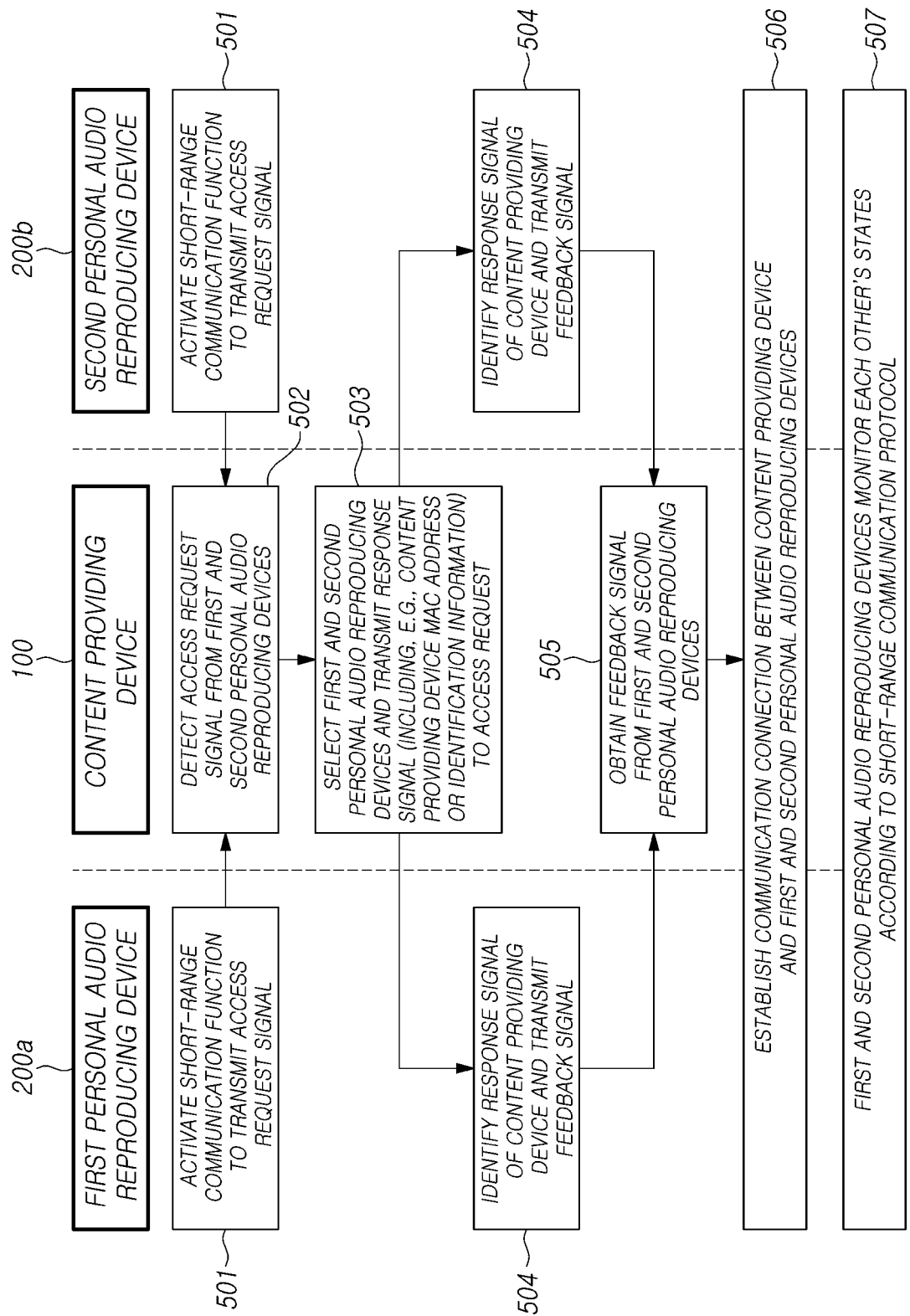

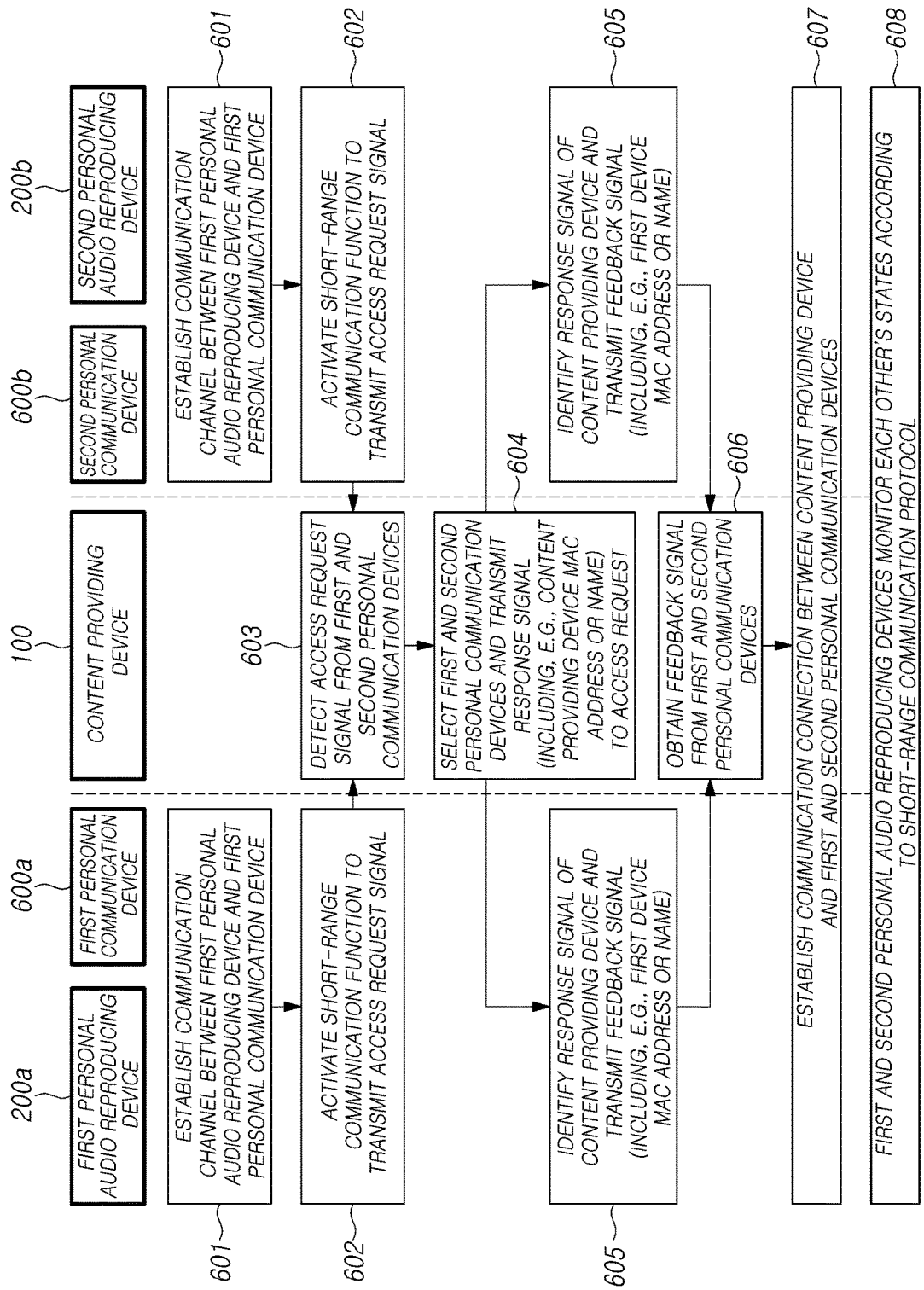

FIG. 20
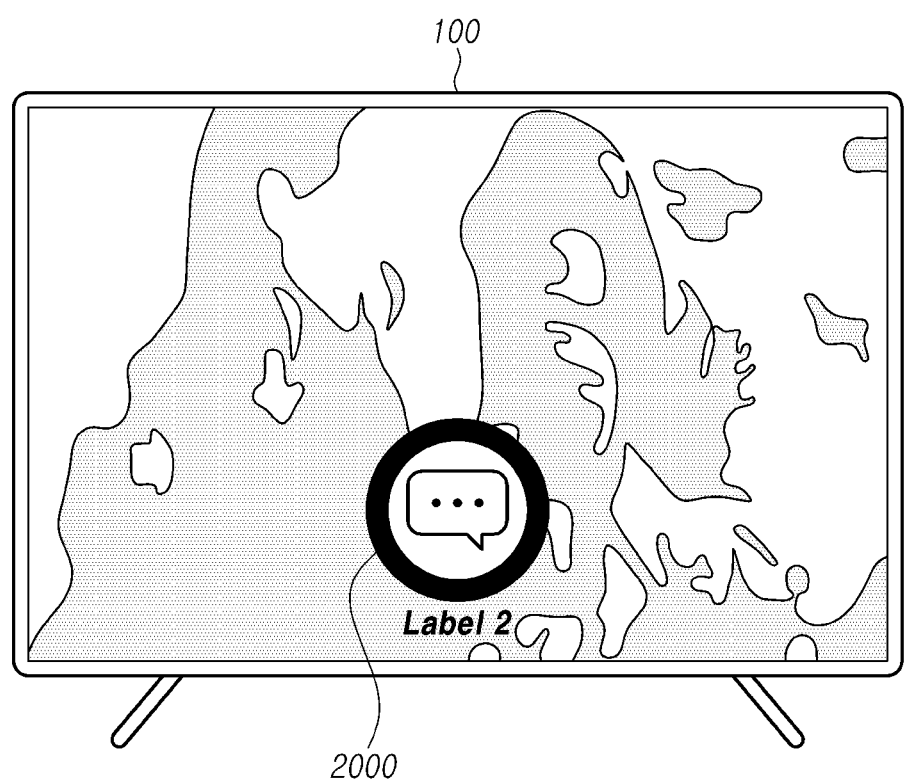
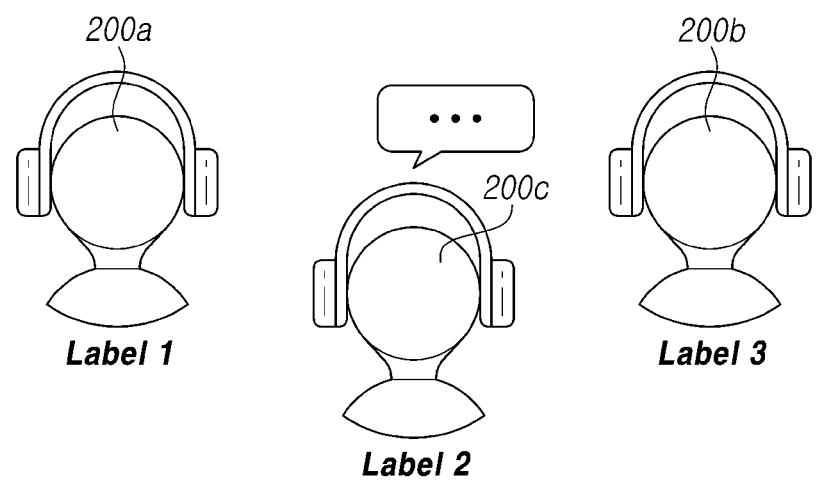

FIG.23
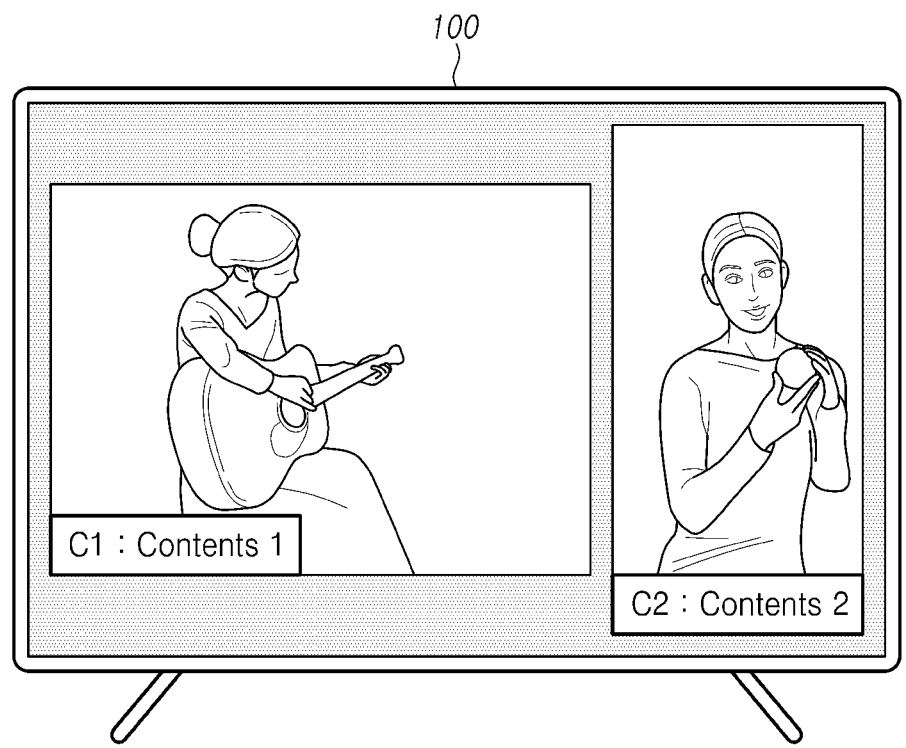
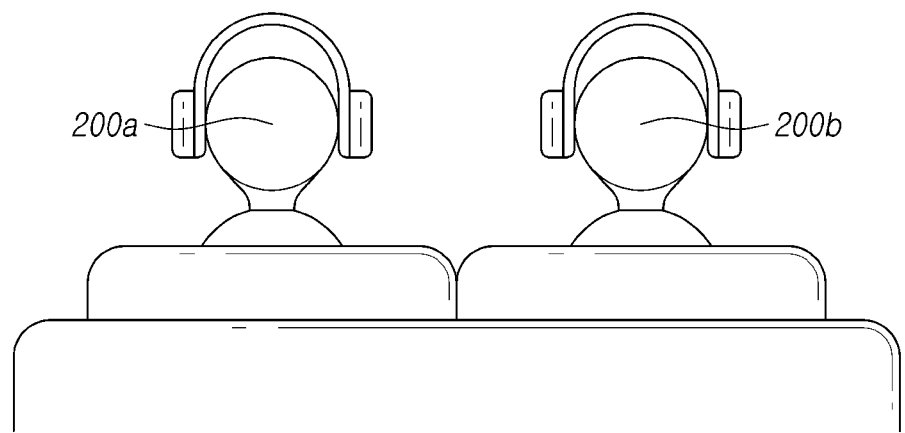

METHOD FOR CONTROLLING SOUND OUTPUT OF AUDIO REPRODUCING DEVICE AND ELECTRONIC DEVICE PERFORMING THE SAME

CROSS-REFERENCE TO RELATED APPLICATIONS

This application is a continuation application, under 35 U.S.C. § 111(a), of International Application No. PCT/KR2023/008673 designating the United States, filed on Jun. 22, 2023, in the Korean Intellectual Property Receiving Office, which claims priority from Korean Patent Application No. 10-2022-0136466, filed on Oct. 21, 2022, in the Korean Intellectual Property Office, the disclosures of which are hereby incorporated by reference herein in their entireties.

BACKGROUND

1. Field

Various embodiments of the disclosure relate to a method for automatically controlling the sound output of a personal audio reproducing device according to a mode and an electronic device performing the method.

2. Description of the Related Art

Since the pandemic, family members are spending more time together in the same room in the house, doing their own activities. While in the same room, each family member may want their own audio experience, whether it's playing a game, watching TV, listening to music, or sleeping quietly. This may happen not only within the home, but also between different people in different spaces. To avoid audio conflicts in such environments, personal audio reproducing devices (e.g., wireless headphones, wireless earphones) are increasingly used by different people in the same room. Personal audio reproducing devices offer a variety of features to create an immersive audio listening experience for users, such as external noise isolation and stereo sound effects.

People may utilize their personal audio reproducing devices to access the same content providing device or a plurality of different content providing devices positioned near each other to consume the content provided by the content providing device(s). For example, a couple may each wear wireless headphones to watch the same TV program (or separate programs from the same TV) simultaneously while a baby sleeps in the house. While listening to content simultaneously through their respective personal audio reproducing devices connected to the content providing device, they may want to have a casual chat with each other, and may need to take their personal audio reproducing devices off for a moment to do so. The process of taking off and putting back on a personal audio reproducing device each time a conversation is needed can disrupt the user's content listening experience.

SUMMARY

Aspects of embodiments of the disclosure will be set forth in part in the description which follows and, in part, will be apparent from the description, or may be learned by practice of the presented embodiments.

According to an embodiment of the disclosure, there is provided a method of controlling a sound output of a first audio reproducing device, the first audio reproducing device being operable in a simultaneous listening mode with a second audio reproducing device such that, in the simultaneous listening mode, each of the first audio reproducing device and the second audio reproducing device operate to output a content sound based on an audio content signal streamed from a corresponding content providing device through a communication connection, according to their respective sound output settings, the method including detecting a conversation request generated from the second audio reproducing device while the first audio reproducing device and the second audio reproducing device operate in the simultaneous listening mode; controlling the first audio reproducing device to exit the simultaneous listening mode, enter a conversation mode, and change the sound output setting of the first audio reproducing device, in response to detecting the conversation request; and controlling the first audio reproducing device to output the content sound based on the changed sound output setting while operating in the conversation mode.

According to an embodiment of the disclosure, in the simultaneous listening mode, the sound output setting of the first audio reproducing device may include a setting to turn on an active noise cancellation (ANC) function, and in the conversation mode, the changed sound output setting may include a setting to turn off the ANC function.

According to an embodiment of the disclosure, the first audio reproducing device may include a microphone configured to obtain external noise, and the changed sound output setting may include a setting to turn on a transparency mode to output a noise sound based on the obtained external noise along with the content sound.

According to an embodiment of the disclosure, the sound output setting of the first audio reproducing device may include at least one of a 3D sound effect setting and a volume setting for the content sound, and the changed sound output setting may include a changed setting of at least one of the 3D sound effect setting and the volume setting.

According to an embodiment of the disclosure, the method may further include detecting a conversation request generated on the first audio reproducing device for the second audio reproducing device while the first audio reproducing device and the second audio reproducing device operate in the simultaneous listening mode; controlling the first audio reproducing device to exit the simultaneous listening mode, enter the conversation mode, and change the sound output setting of the first audio reproducing device, in response to detecting the conversation request generated on the first audio reproducing device; and controlling the first audio reproducing device to output the content sound based on the changed sound output setting while operating in the conversation mode.

According to an embodiment of the disclosure, detecting the conversation request generated on the first audio reproducing device may include detecting at least one of a predetermined touch input by a user, a predetermined button input or predetermined button input release, a predetermined key input or predetermined key input release, a voice input having a threshold value or more, a motion having a threshold value or more, and a motion having a predetermined pattern, generated on the first audio reproducing device.

According to an embodiment of the disclosure, detecting the conversation request generated on the first audio reproducing device may include detecting a change in a distance or angle between the first audio reproducing device and the second audio reproducing device.

According to an embodiment of the disclosure, the method may further include, when detecting the conversation request generated on the first audio reproducing device, providing a signal to indicate generation of the conversation request generated on the first audio reproducing device to the content providing device or the second audio reproducing device through the communication connection.

According to an embodiment of the disclosure, the first audio reproducing device may include a microphone configured to obtain a voice input from a user, and the method may further include controlling the first audio reproducing device to transmit the voice input obtained through the microphone to the content providing device or the second audio reproducing device while operating in the conversation mode.

According to an embodiment of the disclosure, the second audio reproducing device may include a microphone configured to obtain a voice input from a second user, and the method may further include controlling the first audio reproducing device to output a conversation sound based on the voice input obtained from the second audio reproducing device, overlaid on the content sound, based on the changed sound output setting while operating in the conversation mode.

According to an embodiment of the disclosure, the method may further include detecting respective positions of the content providing device and the second audio reproducing device, relative to the first audio reproducing device, wherein the changed sound output setting may include a three-dimensional (3D) sound effect setting of the conversation sound and the content sound based on the detected relative positions.

According to an embodiment of the disclosure, the method may further include detecting a request to end the conversation mode, generated on the first audio reproducing device or the second audio reproducing device, while operating in the conversation mode; when detecting the request to end the conversation mode, controlling the first audio reproducing device to exit the conversation mode and enter the simultaneous listening mode and restoring the sound output setting set prior to entering the conversation mode; and controlling the first audio reproducing device to output the content sound based on the restored sound output setting in the simultaneous listening mode.

According to an embodiment of the disclosure, detecting the request to end the conversation mode may include detecting at least one of a predetermined touch input, a predetermined button input or predetermined button input release, a predetermined key input or predetermined key input release, absence of a voice input having a threshold value or more during a predetermined period or longer, absence of a motion having a threshold value or more during a predetermined period or longer, and a motion having a predetermined pattern, generated on the first audio reproducing device or the second audio reproducing device.

According to an embodiment of the disclosure, an electronic device including a memory storing at least one instruction; and at least one processor electrically connected to the memory and executing the at least one instruction, wherein the at least one processor is configured to perform a method of controlling a sound output of a first audio reproducing device, the first audio reproducing device being operable in a simultaneous listening mode with a second audio reproducing device such that, in the simultaneous listening mode, each of the first audio reproducing device and the second audio reproducing device operate to output a content sound based on an audio content signal streamed from a corresponding content providing device through a communication connection, according to their respective sound output settings, the method including detecting a conversation request generated from the second audio reproducing device while the first audio reproducing device and the second audio reproducing device operate in the simultaneous listening mode; controlling the first audio reproducing device to exit the simultaneous listening mode, enter a conversation mode, and change the sound output setting of the first audio reproducing device, in response to detecting the conversation request; and controlling the first audio reproducing device to output the content sound based on the changed sound output setting while operating in the conversation mode.

According to an embodiment of the disclosure, the electronic device may further include an audio processing circuit providing an audio content signal according to a timeline; a display; and a communication circuit configured to establish the communication connection to each of the first audio reproducing device and the second audio reproducing device and transmit the audio content signal from the audio processing circuit to each of the first audio reproducing device and the second audio reproducing device through the communication connection, wherein each of the audio processing circuit, the display, and the communication circuit may be connected to the processor, and the processor may be configured to detect a conversation request generated on the first audio reproducing device for the second audio reproducing device, while transmitting the audio content signal to each of the first audio reproducing device and the second audio reproducing device through the communication circuit, and when detecting the conversation request, control the display to display an indicator indicating a conversation state between the first audio reproducing device and the second audio reproducing device.

According to an embodiment of the disclosure, the indicator indicating the conversation state may include an icon representing each of the first audio reproducing device and the second audio reproducing device.

According to an embodiment of the disclosure, the indicator indicating the conversation state may include an indication on which of the first audio reproducing device and the second audio reproducing device an utterance input is currently generated.

According to an embodiment of the disclosure, the processor may be configured to store corresponding timeline information regarding the audio content signal when detecting the conversation request, detect an end of the conversation mode, and when detecting the end of the conversation, control the audio processing circuit to move a time of providing the audio content signal on the timeline based on the stored timeline information.

According to an embodiment of the disclosure, the processor may be configured to, when detecting the end of the conversation mode, control the display to display a selection option indicating whether to move the time of providing the audio content signal on the timeline based on the stored timeline information; and control the audio processing circuit to move the time of providing the audio content signal on the timeline based on the stored timeline information in response to the selection option being selected.

According to an embodiment of the disclosure, the audio content signal transmitted to the first audio reproducing device and the second audio reproducing device through the communication circuit may include different content information.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 4A and 4B are flowcharts schematically illustrating a procedure for allowing a plurality of personal audio reproducing devices to access a content providing device to perform simultaneous listening and allowing a conversation mode between users to start, proceed, and end through a request according to an embodiment of the disclosure;

FIG. 5 is a flowchart schematically illustrating a process in which a plurality of personal audio reproducing devices access a content providing device for simultaneous listening according to an embodiment of the disclosure;

FIG. 6 is a flowchart schematically illustrating a process in which a plurality of personal audio reproducing devices access a content providing device for simultaneous listening according to an embodiment of the disclosure;

FIGS. 19 and 20 are views illustrating example contexts in which an indicator indicating the progress of a conversation between users is displayed on a display of a content providing device when a conversation mode is performed between users through three personal audio reproducing devices each connected to a content providing device according to an embodiment of the disclosure;

FIG. 23 is a view schematically illustrating a simultaneous listening environment by a plurality of users according to an embodiment of the disclosure;

DETAILED DESCRIPTION

Figure 1:
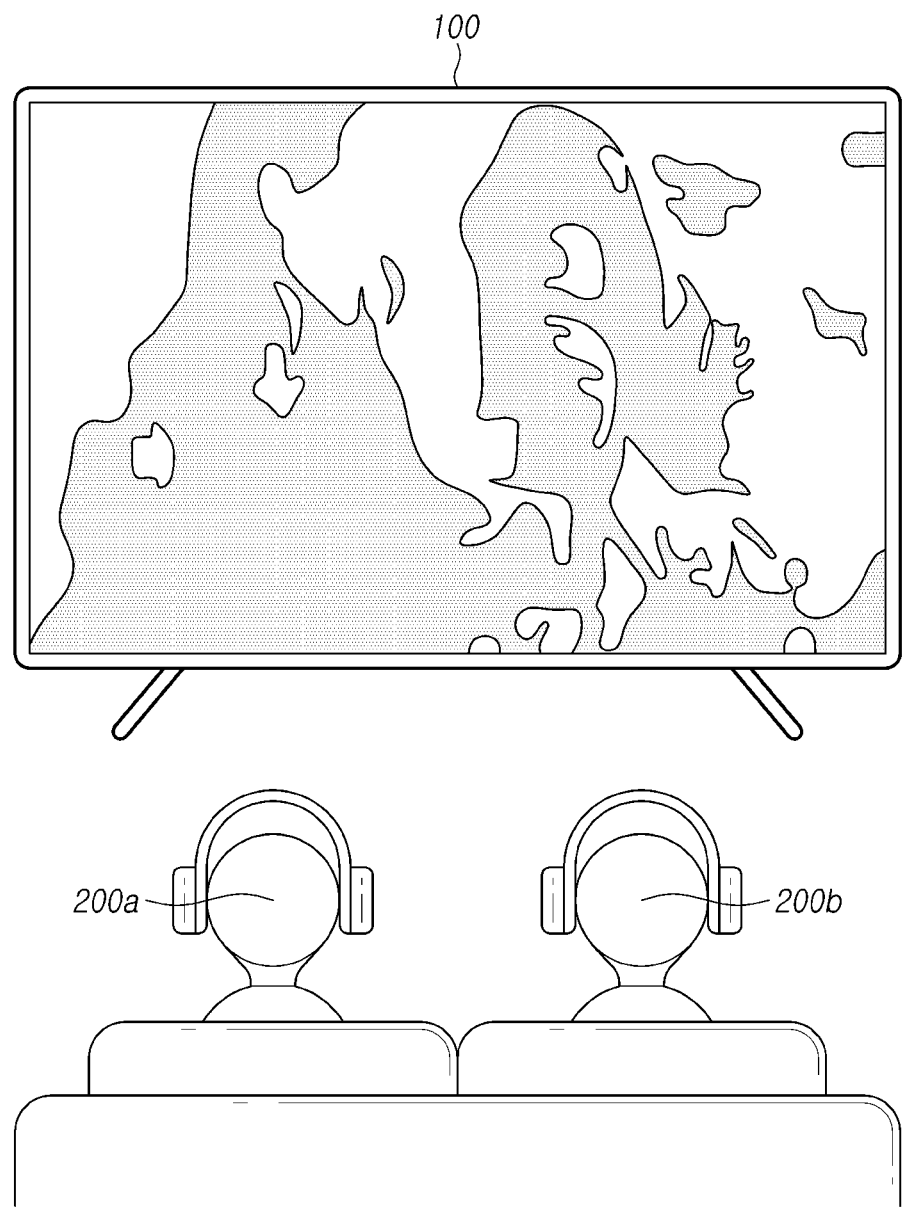
FIG. 1 is a view schematically illustrating an environment where a simultaneous listening mode and conversation mode may apply through a plurality of personal audio reproducing devices according to an embodiment of the disclosure.

Hereinafter, an embodiment is described in detail with reference to the accompanying drawings. In the following description, specific details, such as detailed configurations and components, will be provided merely for a better understanding of embodiments of the disclosure. The same or similar reference denotations may be used to refer to the same or similar elements throughout the specification and the drawings. Further, for clarity and brevity, no description is made of well-known functions and configurations in the drawings and relevant descriptions.

According to an embodiment of the disclosure, users may smoothly perform a conversation with their personal audio reproducing devices put on without separate cumbersome manipulation when they try to have a short conversation while listening to content through their respective personal audio reproducing devices.

According to an embodiment of the disclosure, each user may obtain directional sound reflecting the positions of the counterpart user and the content providing device therefor when performing a conversation with the personal audio reproducing device put on and may perform a vivid conversation as if she does not wear the personal audio reproducing device. According to an embodiment of the disclosure, users may continue to have an optimized content listening experience through the personal audio reproducing devices that they wear, after the conversation ends.

According to an embodiment of the disclosure, a method for appropriately changing the output settings of a plurality of audio reproducing devices simultaneously according to the mode may apply in various situations. For example, in a gallery, where each spectator is wearing a personal audio reproducing device and listening to audio content about the artwork, a question and answer session between the spectator and the narrator (docent) may occur. In such a case, the sound output setting of the audio reproducing devices worn by the spectator and the narrator may be temporarily altered so that the conversation sound based on the voice input from the narrator's audio reproducing device may be overlaid with the content sound and output through the spectator's audio reproducing device. In an embodiment, various adjustments, such as increasing or decreasing the volume of the content sound for the artwork narration may be performed during a question and answer session between the spectator and the narrator (e.g., in the conversation mode).

FIG. 1 is a view schematically illustrating an environment where a simultaneous listening mode and conversation mode may apply through a plurality of personal audio reproducing devices according to an embodiment of the disclosure.

As illustrated, two personal audio reproducing devices 200a and 200b are wirelessly connected to the content providing device 100. As illustrated, the content providing device 100 may be a TV device, but the disclosure is not limited thereto. The content providing device 100 may be various devices that provide audio content signals, such as a mobile terminal, a tablet, a computer, and various sound devices, but is not limited to a specific type.

Users wearing the personal audio reproducing devices 200a and 200b, respectively, may watch content, e.g., a TV program, provided from the content providing device 100 in the simultaneous listening mode. In the disclosure, the simultaneous listening mode may refer to an operation state in which, e.g., a plurality of personal audio reproducing devices are communicatively connected to the same or different content providing devices, to simultaneously receive audio content signals streamed from the content providing device(s) and play the content signals for user listening.

In an embodiment, each of the users wearing the personal audio reproducing devices 200a and 200b may perform a conversation with the user on the counterpart personal audio reproducing device while watching content, e.g., a TV program, provided from the content providing device 100 in the conversation mode. The conversation mode may refer to an operation state in which each of the personal audio reproducing devices 200a and 200b receives and plays the audio signal streamed from the content providing device for user listening, similar to the simultaneous listening mode, but the state of the audio signal sound is changed to enable smooth conversation between the users wearing the personal audio reproducing devices 200a and 200b. For example, in the conversation mode, the volume of the content sound from the content providing device, output from each of the personal audio reproducing devices 200a and 200b, may be automatically reduced, as compared with the simultaneous listening mode, but the disclosure is not limited thereto.

As illustrated in FIG. 1, the contents that all users are watching in the simultaneous listening mode may be the same, but the disclosure is not limited thereto. As illustrated in FIG. 1, all users may be connected to the same content providing device in the simultaneous listening mode, but the disclosure is not limited thereto. According to an embodiment, users wearing their own personal audio reproducing devices may be connected to the same content providing device 100 and watch separate contents, e.g., separate TV programs, provided by the content providing device 100. According to an embodiment of the disclosure, users wearing their own personal audio reproducing devices may be connected to different content providing devices and watch content provided by the respective content providing devices.

Figure 2:
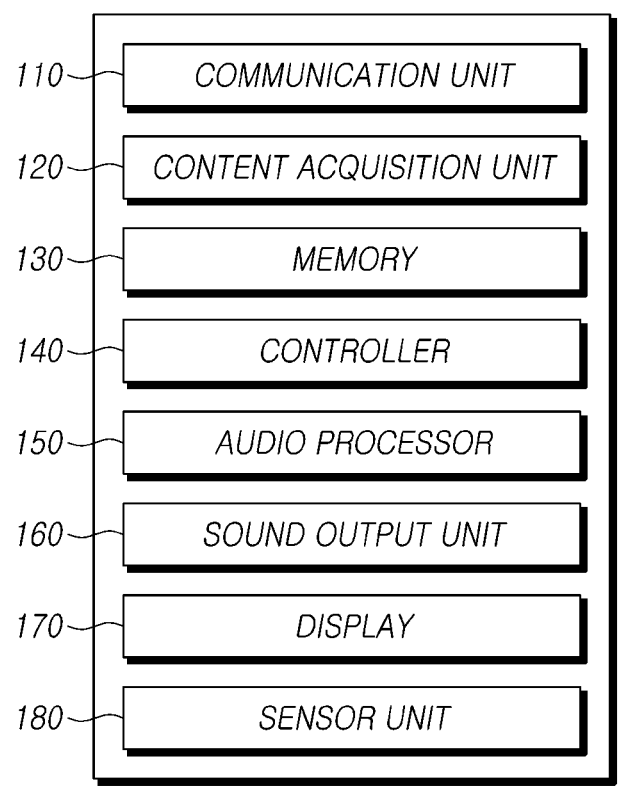
FIG. 2 is a functional block diagram schematically illustrating functional components of a content providing device according to an embodiment of the disclosure.

FIG. 2 is a functional block diagram schematically illustrating functional components of a content providing device according to an embodiment of the disclosure. As illustrated, the content providing device 100 may include a communication unit 110, a content acquisition unit 120, a memory 130, a controller 140, an audio processor 150, a sound output unit 160, a display 170, and a sensor unit 180.

In an embodiment, the communication unit 110 may establish a communication connection with an external device according to one or more wired/wireless communication protocols. According to an embodiment, the communication unit 110 may establish wireless connection with each of one or more personal audio reproducing devices (e.g., wireless headphones, wireless earphones) and/or personal communication devices (e.g., various personal mobile terminals such as smartphones, tablets, etc.) and communicate with each other through the wireless connection. In an embodiment, the communication unit 110 may communicate based on any short-range wireless communication protocol including, e.g., Wi-Fi, Bluetooth, UWB, IrDA, etc. According to an embodiment, the communication unit 110 may be connected to, e.g., a personal audio reproducing device (200a or 200b of FIG. 1) to establish a short-range wireless communication channel, and may transmit, e.g., an audio content signal output from the audio processor 150 of the content providing device 100 to be described below, through the established communication channel. According to an embodiment, the communication unit 110 may receive various pieces of information, such as user input control information, voice information, various pieces of state sensing information, and position information, which are obtained and transmitted from the personal audio reproducing device 200a or 200b of FIG. 1. According to an embodiment, the communication unit 110 may also transmit various pieces of information, such as user input control information, voice information, various pieces of state sensing information, and position information, which are transmitted from the personal audio reproducing device and received by the communication unit 110, to another personal audio reproducing device connected to the communication unit 110 according to the short-range wireless communication protocol.

According to an embodiment, the content acquisition unit 120 may receive multimedia content data from various external content source devices according to any of various wired and wireless methods. According to an embodiment, the multimedia content data may include, e.g., video data of a moving image or a still image or audio data of a voice or music. According to an embodiment, the content acquisition unit 120 may selectively receive each broadcast content data by tuning a signal (e.g., a broadcast signal) of a specific channel (frequency) among radio wave signals broadcast in the air. According to an embodiment, the content acquisition unit 120 may receive content data from a certain content source device, e.g., a set-top box or other external content source device, in a wired manner using various types of image transmission cables, e.g., a component cable, a CVBS cable, an HDMI cable, a USB cable, an Ethernet cable, or in a short-range wireless protocol such as Wi-Fi, Bluetooth, Zigbee, or Z-wave. According to an embodiment, the content acquisition unit 120 may receive various pieces of content data from an external content providing server according to any wired or wireless communication protocol such as TCP/IP, UDP, HTTP, HTTPS, FTP, SFTP, MQTT, GSM, CDMA, WCDMA, WiMAX, LTE, LTE-A, 5G, or 6G. According to an embodiment, the external content server may be, e.g., an IPTV server, an OTT server, or the like, but the disclosure is not limited to a specific form. Although it is described herein that the content providing device 100 includes the content acquisition unit 120, but the disclosure is not limited thereto. In an embodiment, the content providing device 100 that does not include the content acquisition unit 120 may be used.

According to an embodiment, the memory 130 may store various data that may be used by each component of the content providing device 100. The memory 130 may include, e.g., various types of software, programs, and related input/output data that may be used to perform functions of the content providing device 100. In an embodiment, the memory 130 may store various types of content data. In an embodiment, the memory 130 may store device information, e.g., a MAC address, identification information, security key information, and/or position information about each personal audio reproducing device 200a and 200b of FIG. 1 capable of communication connection with the communication unit 110. In an embodiment, the memory 130 may store various types of control information and/or sensing information received from each personal audio reproducing device 200a and 200b of FIG. 1 through a wireless communication connection using the communication unit 110. In an embodiment, the memory 130 may store sound setting information (e.g., various control information to be applied to processing an audio content signal to be provided to the corresponding personal audio reproducing device) set for each of the personal audio reproducing devices 200a and 200b of FIG. 1 capable of communication connection with the communication unit 110. In an embodiment, the memory 130 may store sound setting information for a simultaneous listening mode (or a normal listening mode), which is set for each of the personal audio reproducing devices 200a and 200b of FIG. 1, and sound setting information for a conversation mode to be described below. In an embodiment, the sound setting information for each personal audio reproducing device 200a and 200b of FIG. 1 stored in the memory 130 may include, e.g., volume information, information about whether to activate the ANC circuit, information about whether to apply a transparent mode, parameters for generating a three-dimensional (3D) sound effect, adjustment criteria, or the like. In an embodiment, the memory 130 may include a volatile memory or a non-volatile memory.

According to an embodiment, the controller 140 may control the overall operation of each component of the content providing device 100. In an embodiment, the controller 140 may control the communication unit 110 to be communicatively connected to each of the personal audio reproducing devices 200a and 200b of FIG. 1. In an embodiment, the controller 140 may obtain various types of information, e.g., user input control information, voice information, various types of state sensing information, position information, and the like, received from the personal audio reproducing device 200a or 200b of FIG. 1 through the communication unit 110. In an embodiment, the controller 140 may detect, e.g., a request to start the conversation mode, consent to enter the conversation mode, and/or a request to release the conversation mode, based on various pieces of information from the personal audio reproducing device 200a or 200b of FIG. 1. In an embodiment, the controller 140 may determine to enter the simultaneous listening mode and/or the conversation mode of the communicatively connected personal audio reproducing devices 200a and 200b of FIG. 1. In an embodiment, when the controller 140 determines to enter the simultaneous listening mode and/or the conversation mode for the communicatively connected personal audio reproducing devices 200a and 200b of FIG. 1, the controller 140 may determine a sound output setting corresponding thereto. In an embodiment, the controller 140 may control the audio processor 160, which is described below, to process the audio signal according to the determined sound output setting. In an embodiment, the controller 140 may transmit information about the determined sound output setting to the corresponding personal audio reproducing device through the communication unit 110. As described above, the sound output setting information for each personal audio reproducing device may include, e.g., volume information, ANC circuit activation information, transparent mode application information, parameters or adjustment criteria for generating 3D sound effects, but the disclosure is not limited thereto.

In an embodiment, the controller 140 may allow the voice information received from the personal audio reproducing devices 200a and 200b of FIG. 1 through the communication unit 110 during the conversation mode to be processed through the audio processor 150 and then transmitted to another personal audio reproducing device in the conversation mode. In an embodiment, the controller 140 may transmit various types of user input information obtained from the personal audio reproducing device 200 through the communication unit 110 to another personal audio reproducing device 200 connected to the content providing device 100.

In an embodiment, the audio processor 150 may receive an audio signal obtained through the communication unit 110 or the content acquisition unit 120. In an embodiment, the audio processor 150 may receive the voice and/or sound signal obtained from the personal audio reproducing devices 200a and 200b of FIG. 1 through the communication unit 110. In an embodiment, the audio processor 150 may receive the audio signal of the multimedia content obtained through the content acquisition unit 120. In an embodiment, the audio processor 150 may also obtain the audio signal from another component of the content providing device 110, e.g., the memory 130 or the controller 140.

In an embodiment, the audio processor 150 may perform various processing on the obtained audio signal. In an embodiment, the audio processor 150 may synthesize a plurality of obtained analog audio signals into one analog audio signal and convert the analog audio signal into a digital audio signal. In an embodiment, the audio processor 150 may perform various processing, such as changing a sampling ratio, applying one or more filters, interpolation, amplifying or attenuating all or some frequency bands, noise processing (e.g., noise or echo attenuation), channel change (e.g., switching between mono and stereo), 3D sound processing, mixing, or extracting a specified signal, on the digital audio signal according to the sound output setting determined by the controller 140. In an embodiment, the audio processor 150 may generate a 3D sound audio signal (e.g., a stereo or 5.1 channel signal) divided into a plurality of channels from, e.g., a digital audio signal. According to an embodiment, the audio processor 150 may generate a Dolby Atmos type object-based 3D sound audio signal. In an embodiment, the digital audio signal processed by the audio processor 150 may be transmitted to the personal audio reproducing devices 200a and 200b of FIG. 1 communicatively connected through the communication unit 110. In an embodiment, the audio processor 150 may convert the processed digital audio signal into an analog audio signal and output the analog audio signal.

In an embodiment, the analog audio signal output from the audio processor 150 may be output to the outside through the sound output unit 160. In an embodiment, the sound output unit 160 may include one or more speakers. In an embodiment, the 3D sound audio signal generated and output from the audio processor 150 may be output through the plurality of speakers of the sound output unit 160.

According to an embodiment, the display 170 may visually output content obtained by the communication unit 110 and/or the content acquisition unit 120. According to an embodiment, the display 170 may display a user interface for controlling setting information about each of the personal audio reproducing devices 200a and 200b of FIG. 1. In an embodiment, when the conversation mode is initiated between the plurality of personal audio reproducing devices 200a and 200b of FIG. 1 each connected to the content providing device 100, the display 170 may display an indicator indicating the initiation state of the conversation mode, an indicator indicating the progress state of the dialog between the plurality of personal audio reproducing devices (e.g., including an indicator indicating a device corresponding to the speaker), or the like. In an embodiment, the display 170 may be implemented as any one of a liquid crystal display (LCD), a light-emitting diode (LED) display, an organic light-emitting diode (OLED) display, a micro electromechanical systems (MEMS) display, or an electronic paper display, but is not limited thereto. In an embodiment, the display 170 may include, for example, a display, a hologram device, or a projector and control circuitry to control a corresponding one of the display, hologram device, and projector. According to an embodiment, the display 170 may include a touch sensor configured to detect a touch, or a pressure sensor configured to measure the intensity of a force generated by the touch.

According to an embodiment, the sensor unit 180 may include one or more sensors for detecting an operation state, an environmental state, or the like of the content providing device 100. In an embodiment, the sensor unit 180 may include, e.g., a geomagnetic sensor, an IMU sensor, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, a GPS sensor, and/or an illuminance sensor. In an embodiment, the sensor unit 180 may obtain motion information about the content providing device 100 (e.g., motion direction information about the content providing device 100 and/or tilt information about the content providing device 100).

The configuration of the content providing device 100 described above with reference to FIG. 2 is merely exemplary, and the content providing device to which the disclosure may be applied may have a modified configuration and function unlike the above-described configuration.

Figure 3:
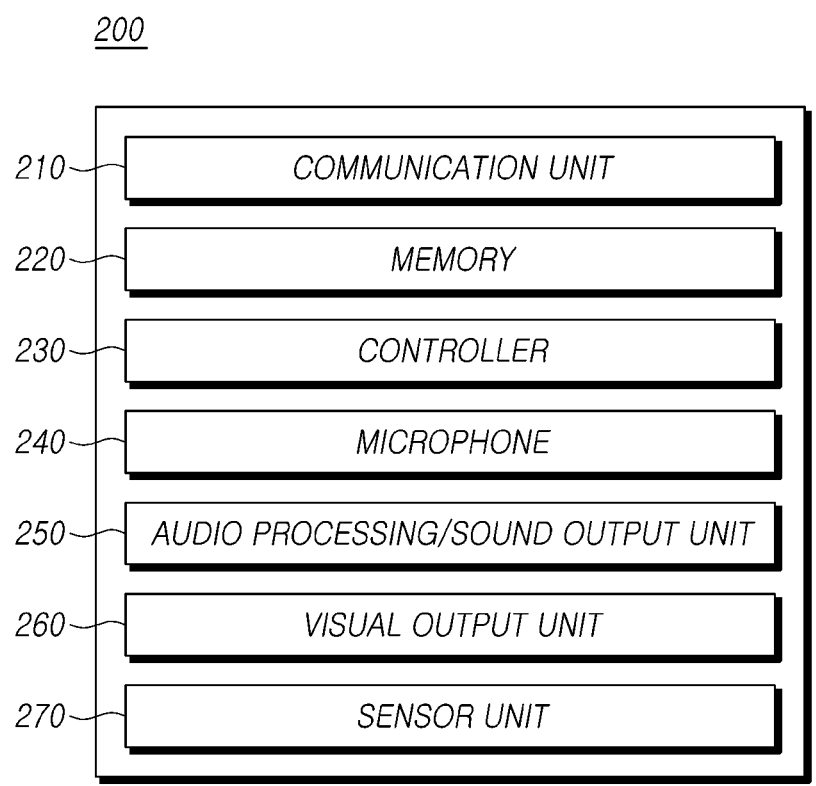
FIG. 3 is a functional block diagram schematically illustrating functional components of a personal audio reproducing device according to an embodiment of the disclosure.

FIG. 3 is a functional block diagram schematically illustrating functional components of a personal audio reproducing device according to an embodiment of the disclosure. As illustrated, a personal audio reproducing device 200 may include a communication unit 210, a memory 220, a controller 230, a microphone 240, an audio processing/sound output unit 250, a visual output unit 260, and a sensor unit 270. The personal audio reproducing device 200 illustrated in FIG. 3 may correspond to each of the personal audio reproducing devices 200a and 200b of FIG. 1, but the disclosure is not limited thereto.

In an embodiment, the communication unit 210 may establish a communication connection with an external device according to one or more wired/wireless communication protocols. In an embodiment, the communication unit 210 may support communication based on any short-range wireless communication protocol including, e.g., Wi-Fi, Bluetooth, UWB, IrDA, etc. According to an embodiment, the communication unit 210 may establish wireless connection with each of the content providing device 100 of FIG. 1 and/or another personal communication device (e.g., a personal terminal such as a smartphone, a tablet, or the like, which is an intermediate device for relaying communication with the content providing device 100) through, e.g., a short-range wireless communication channel, and may communicate therethrough. According to an embodiment, the communication unit 210 may transmit and receive a signal to and from another personal audio reproducing device through, e.g., a short-range wireless communication channel.

According to an embodiment, the communication unit 210 may establish a short-range wireless communication connection to the content providing device 100 and receive various kinds of signal information, e.g., an audio content signal and various kinds of setting/control information through the established communication channel. According to an embodiment, the communication unit 210 may receive various pieces of information, such as voice information, user input control information, various state sensing information, position information, and the like, obtained from an external device similar to the corresponding personal audio reproducing device 200, e.g., the content providing device 100 of FIG. 1, from another personal audio reproducing device or via the content providing device 100, according to any short-range wireless communication protocol. According to an embodiment, the communication unit 210 may also transmit various pieces of information obtained on the personal audio reproducing device 200, e.g., sound and/or voice information, user input control information, various pieces of state sensing information, position information, and the like, to the content providing device 100 and/or another personal audio reproducing device according to, e.g., a short-range wireless communication protocol.

According to an embodiment, the memory 220 may store various data that may be used by each component of the personal audio reproducing device 200. The memory 220 may include, e.g., various types of software, programs, and related input/output data that may be used to perform functions of the personal audio reproducing device 200. According to an embodiment, the memory 220 may store device information capable of communication connection with the communication unit 210, e.g., a MAC address, identification information, security key information, and/or position information about each of the content providing device 100, another personal communication device, and/or another personal audio reproducing device. In an embodiment, the memory 220 may store various configuration/control information and/or sensing information received from the content providing device 100, another personal communication device, and/or another personal audio reproducing device through wireless connection using the communication unit 210. In an embodiment, the memory 220 may store one or more pieces of sound output setting information for controlling a state of audio signal sound to be output through the audio processing/sound output unit 250 to be described below. In an embodiment, the memory 220 may store sound setting information for the simultaneous listening mode (or the normal listening mode) and sound setting information for the conversation mode to be described below. In an embodiment, the sound setting information stored in the memory 220 may include, e.g., volume information, information about whether to activate the ANC circuit, information about whether to apply a transparent mode, parameters or adjustment criteria for generating a 3D sound effect, and the like. In an embodiment, the memory 130 may include a volatile memory or a non-volatile memory.

In an embodiment, the controller 230 may control the overall operation of each component of the personal audio reproducing device 200. In an embodiment, the controller 230 may control the communication unit 210 to be communicatively connected to each of the content providing device 100, a separate personal communication device, and/or another personal audio reproducing device. In an embodiment, the controller 230 may control the audio processing/sound output unit 250, which is described below, to output content sound based on the content audio signal obtained from the content providing device 100 through the communication unit 210, according to the operation mode (e.g., simultaneous listening mode, conversation mode, etc.) and/or sound output setting determined for the personal audio reproducing device 200. In an embodiment, the controller 230 may receive various information received from the content providing device 100 communicatively connected through the communication unit 210, another separate personal communication device, and/or another personal audio reproducing device, e.g., user input control information, voice information, various state sensing information, and/or position information obtained on another personal audio reproducing device. In an embodiment, the controller 230 may detect a conversation mode start request, a conversation mode entry consent, and/or a conversation mode release request for the personal audio reproducing device 200 based on the above-described information received from the content providing device 100, another personal communication device, and/or another personal audio reproducing device. In an embodiment, the controller 230 may obtain various types of sensing information by the sensor unit 270 to be described below. In an embodiment, the controller 230 may detect, based on sensing information obtained from the sensor unit 270, a request to start the conversation mode, consent to enter the conversation mode, and/or a request to release the conversation mode in, e.g., the personal audio reproducing device 200. In an embodiment, the controller 230 may determine to enter the simultaneous listening mode and/or the conversation mode for the personal audio reproducing device 200. In an embodiment, the controller 230 may determine a sound output setting corresponding to whether the personal audio reproducing device 200 is in the simultaneous listening mode and/or the conversation mode. In an embodiment, the controller 230 may control the operation of the microphone 240 and the audio processing/sound output unit 250, which is described below, according to the determined sound output setting.

In an embodiment, the controller 230 may allow voice information received from another personal audio reproducing device through the communication unit 210 during the conversation mode to be processed by the audio processing/sound output unit 250 to be described below and output overlaid with the above-described content sound. In an embodiment, the controller 230 may allow the voice information obtained on the personal audio reproducing device 200 through the microphone 240 to be described below to be transmitted to the content providing device 100, another personal communication device, and/or another personal audio reproducing device in the conversation mode through the communication unit 210 during the conversation mode. In an embodiment, during the conversation mode (when the transparent mode is applied), the controller 230 may control to output the voice information obtained on the personal audio reproducing device 200 through the microphone 240, overlaid with the above-described content sound, through the audio processing/sound output unit 250 to be described below.

In an embodiment, the microphone 240 may include, e.g., a dynamic microphone, a condenser microphone, or a piezo microphone. In an embodiment, the microphone 240 may obtain various noises from the outside or an uttered voice input from the user. In an embodiment, the microphone 240 may convert the obtained voice and/or sound into a digital audio signal. In an embodiment, the voice and/or sound obtained from the microphone 240 may be processed differently according to the mode and/or sound output setting of the corresponding personal audio reproducing device 200. In one example, when the personal audio reproducing device 200 is in the conversation mode, the voice and/or sound obtained from the microphone 240 may be converted into a digital audio signal and transmitted through the communication unit 210 to the content providing device 100 or another external personal audio reproducing device through the communication unit 210. In an embodiment, as described above, when the sound output setting is determined to apply the transparent mode (which may be a normal conversation mode), the voice and/or sound obtained from the microphone 240 may be transferred to the audio processing/sound output unit 250, and may be output, overlaid with the output content sound. In an embodiment, the microphone 240 may include an ANC circuit. In an embodiment, when the personal audio reproducing device 200 is in the simultaneous listening mode and/or the sound output setting is determined to activate the ANC circuit, the microphone 240 may analyze the sound obtained from the microphone 240 through the ANC circuit and generate an offset sound corresponding thereto. The offset sound generated by the microphone 240 may be transferred to the audio processing/sound output unit 250. In this case, in the audio processing/sound output unit 250, the sound obtained from the microphone 240 may be erased by being superposed with the corresponding offset sound. In an embodiment, when the personal audio reproducing device 200 is in the conversation mode and/or the sound output setting is determined to deactivate the ANC circuit, the microphone 240 may not generate the offset sound, and thus the sound obtained by the microphone 240 and transmitted to the audio processing/sound output unit 250 may not be erased.

In an embodiment, the audio processing/sound output unit 250 may include one or more speakers. According to an embodiment, the audio processing/sound output unit 250 may include a pair of speakers separated on both left and right sides, but the disclosure is not limited thereto. In an embodiment, the audio processing/sound output unit 250 may generate, process, and output a sound signal based on the sound output setting information stored in the memory 220. In an embodiment, the audio processing/sound output unit 250 may appropriately process the audio content signal received from the external device through the communication unit 210 based on the sound setting information stored in the memory 220 and then output the audio content signal for user listening. In an embodiment, the audio processing/sound output unit 250 may perform part (e.g., may include, but is not limited to, analog signal conversion of the digital audio signal) or whole of the signal processing process performed by the audio processor 150 of the content providing device 100, but the disclosure is not limited thereto. In an embodiment, the audio processing/sound output unit 250 may allow the voice and/or sound signal obtained through the microphone 250 to be described below to be output to the outside through the audio processing/sound output unit 250, based on sound setting information stored in the memory 220.

In an embodiment, the visual output unit 260 may be a visual marker indicating that a user voice input is generated through the microphone 240 described above. In an embodiment, the visual output unit 260 may be, e.g., an LED lamp lit while a user voice input through the microphone 240 is generated.

In an embodiment, the sensor unit 270 may include one or more sensors for detecting an operation state, an environmental state, or the like of the personal audio reproducing device 200. In an embodiment, the sensor unit 270 may include, e.g., a geomagnetic sensor, an IMU sensor, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor. In an embodiment, the acceleration sensor and the gyro sensor may constitute a 6-axis sensor. The 6-axis sensor may detect the variation in the motion of the personal audio reproducing device 200. The 6-axis sensor may include an inertial sensor. For example, the acceleration sensor may measure the force acting in the direction of the x-axis, y-axis, and z-axis in three axes. The gyro sensor may measure the angular velocity by detecting pitch, roll, and yaw in three axes. In an embodiment, the sensor unit 270 may include an acceleration sensor, a gyro sensor, a geomagnetic sensor, an IMU sensor, and the like to obtain motion information (e.g., a motion size and direction, a slope size and direction, a rotation size and a direction position variation in the personal audio reproducing device 200, and the like) of the personal audio reproducing device 200.

The configuration of the personal audio reproducing device 200 described above with reference to FIG. 3 is merely exemplary, and the personal audio reproducing device to which the disclosure may be applied may have a modified configuration and function unlike the above-described configuration.

FIGS. 4A and 4B are flowcharts schematically illustrating a procedure for allowing a plurality of personal audio reproducing devices to access a content providing device to perform simultaneous listening and allowing a conversation mode between users to start, proceed, and end through a request according to an embodiment of the disclosure.

First, in operation 401, a communication connection according to a predetermined communication protocol may be established between the content providing device 100 and each of the first and second personal audio reproducing devices 200a and 200b. In an embodiment, the content providing device 100 and the first and second personal audio reproducing devices 200a and 200b may establish communication connection according to any short-range wireless communication protocol including Wi-Fi, Bluetooth, UWB, IrDA, or the like. A detailed process of establishing a communication connection in operation 401 may reference FIGS. 5 and 6.

FIG. 5 is a flowchart schematically illustrating a process in which a plurality of personal audio reproducing devices access a content providing device for simultaneous listening according to an embodiment of the disclosure. Referring to FIG. 5, a process in which the first personal audio reproducing device 200a and the second personal audio reproducing device 200b establish a communication connection to the content providing device 100 is illustrated.

First, in operation 501, each of the first personal audio reproducing device 200a and the second personal audio reproducing device 200b may activate a communication function to transmit a signal for accessing the content providing device 100. For example, each of the personal audio reproducing devices 200a and 200b may transmit a predetermined signal for accessing the content providing device 100 according to a predetermined short-range wireless communication protocol (e.g., a Bluetooth protocol).

In operation 502, the content providing device 100 may detect the signal transmitted from each of the first and second personal audio reproducing devices 200a and 200b. Then, in operation 503, the content providing device 100 may select each of the devices 200a and 200b for which signal transmission has been detected, and transmit a response to each access request to the first and second personal audio reproducing devices 200a and 200b. In an embodiment, the response signal transmitted from the content providing device 100 to each of the first and second personal audio reproducing devices 200a and 200b may include, e.g., a MAC address, identification information, security key information, position information, and other control information about the content providing device 100.

In operation 504, each of the first and second personal audio reproducing devices 200a and 200b may receive and identify a response signal from the content providing device 100 and transmit feedback information including information necessary for establishing an access channel to the content providing device 100. In an embodiment, the feedback signal provided to the content providing device 100 may include, e.g., the MAC address, identification information, security key information, position information, and other control information regarding each of the first or second personal audio reproducing devices 200a and 200b.

In operation 505, the content providing device 100 may obtain the feedback signal transmitted from each of the first and second personal audio reproducing devices 200a and 200b, and may proceed to operation 506 to complete connection establishment with each of the first and second personal audio reproducing devices 200a and 200b. In an embodiment, the content providing device 100 may store each piece of information received from each of the first and second personal audio reproducing devices 200a and 200b.

Optionally, in operation 507, each of the first or second personal audio reproducing devices 200a and 200b may activate the communication function according to the predetermined short-range wireless communication protocol (e.g., UWB protocol) to transmit the predetermined signal, and may detect the signal transmitted by the counterpart. For example, the first and second personal audio reproducing devices 200a and 200b may detect and monitor the distance between each other, relative positions between each other, and changes therein by detecting the signals transmitted from each other. Although illustrated together in FIG. 5, operation 507 may be separate from a series of sequential operation flows between the content providing device 100 and the first and second personal audio reproducing devices 200a and 200b according to the above-described operations 501 to 506. When the first and second personal audio reproducing devices 200a and 200b continuously detect the signal transmitted by the counterpart according to operation 507 and monitor the distance between the first and second personal audio reproducing devices 200a and 200b and the relative positions of the first and second personal audio reproducing devices 200a and 200b, the monitoring results may be used in connection with performing the simultaneous listening mode or the conversation mode.

FIG. 6 is a flowchart schematically illustrating a process in which a plurality of personal audio reproducing devices access a content providing device for simultaneous listening according to an embodiment of the disclosure. As illustrated, the first and second personal audio reproducing devices 200a and 200b are first connected to the first and second personal communication devices 600a and 600b, respectively, and are communicatively connected to the content providing device 100 through the first and second personal communication devices 600a and 600b. Unlike the first and second personal audio reproducing devices 200a and 200b establishing direct communication channels with the content providing device 100 in FIG. 5, in FIG. 6, the first and second personal audio reproducing devices 200a and 200b establish communication channels with the corresponding first and second personal communication devices 600a and 600b, and then the first and second personal communication devices 600a and 600b communicatively connect with the content providing device 100.

First, in operation 601, the first personal audio reproducing device 200a may establish an access channel with the first personal communication device 600a according to any wireless communication protocol, and the second personal audio reproducing device 200b may establish an access channel with the second personal communication device 600b according to any wireless communication protocol. In an embodiment, the first personal audio reproducing device 200a may establish an access channel for the first personal communication device 600a according to any short-range wireless communication protocol including Bluetooth, Wi-Fi, or the like. In an embodiment, the second personal audio reproducing device 200b may establish an access channel for the second personal communication device 600b according to a short-range wireless communication protocol including Bluetooth, Wi-Fi, or the like. Thereafter, the processes of operation 602 to operation 607 are generally similar to the processes of operation 501 to operation 506 described above with reference to FIG. 5, and are different mainly in that the operation flow is performed between the first and second personal communication devices 600a and 600b and the content providing device 100. Accordingly, a detailed description of operations 602 to 607 will be omitted.

In operation 608, similar to operation 507, the first or second personal audio reproducing devices 200a and 200b may monitor each other. For example, similar to operation 507, each of the first and second personal audio reproducing devices 200a and 200b may activate the communication function according to a predetermined short-range wireless communication protocol (e.g., UWB protocol) to transmit a predetermined signal, and detect the signal transmitted by the counterpart, thereby detecting and monitoring the distance between each other, relative positions between each other, and changes therein. According to an embodiment, in operation 608, the state monitoring of the first or second personal audio reproducing devices 200a and 200b may be performed according to the signal exchange between the first and second personal communication devices 600a and 600b. Similar to what has been mentioned in connection with operation 507, operation 608 may be separate from a series of sequential operation flows between the content providing device 100 and the first and second personal communication devices 600a and 600b according to the above-described operations 602 to 607. In an embodiment, when the state monitoring of the first and second personal audio reproducing devices 200a and 200b is performed in operation 606, the monitoring result may be used in connection with the subsequent progress of the simultaneous listening mode or the conversation mode.

Returning to FIG. 4A, in operation 402, the content providing device 100 may stream and transmit a content audio signal to each of the first and second personal audio reproducing devices 200a and 200b. In an embodiment, the content providing device 100 may play and output multimedia content stored on the content providing device 100 or obtained from the outside in various ways. In an embodiment, the content played by the content providing device 100 may include an audio signal. In an embodiment, the content providing device 100 may stream and transmit the content audio signal to each of the first and second personal audio reproducing devices 200a and 200b through the communication connection established in operation 401.

In operation 403, each of the first and second personal audio reproducing devices 200a and 200b may receive the content audio signal from the content providing device 100 and may output content sound based on the received signal in the simultaneous listening mode. In an embodiment, each of the first and second personal audio reproducing devices 200a and 200b may output the content sound according to a sound output setting preset for the simultaneous listening mode.

In operation 404, a predetermined event indicating a conversation request may be detected in the first personal audio reproducing device 200a. There may be various events predetermined to indicate occurrence of a conversation request. Various types of events that may indicate a conversation request and/or a conversation end request are described below. In an embodiment, after detecting that an event indicating a conversation request has occurred, the first personal audio reproducing device 200a may notify the content providing device 100 of the detection result and/or entry into the conversation mode.

In operation 405, the content providing device 100 may obtain a conversation mode entry request from the first personal audio reproducing device 200a and transmit the obtained request to the second personal audio reproducing device 200b. In operation 406, the second personal audio reproducing device 200b may receive a request to enter the conversation mode transmitted from the content providing device 100. In operation 407, after obtaining the conversation mode entry request in operation 405, the content providing device 100 may determine entry into the conversation mode and may store a corresponding time point (e.g., a content playback time point at the time of entry into the conversation mode) on the timeline of the currently provided content.

In operation 408, each of the first and second personal audio reproducing devices 200a and 200b may enter the conversation mode and may continuously receive the content audio signal from the content providing device 100. Each of the first and second personal audio reproducing devices 200a and 200b may output the content sound based on the received content audio signal according to the sound output setting preset for the conversation mode. In an embodiment, the sound output setting preset for the simultaneous listening mode may be different from the sound output setting preset for the conversation mode.

For example, in the sound output setting for the simultaneous listening mode, the ANC function may be set to be turned on and the transparent mode may be set to be turned off so that the user focuses on the content sound on the personal audio reproducing device, whereas in the sound output setting for the conversation mode (especially when a conversation is performed through natural development), the ANC function may be set to be turned off and the transparent mode may be set to be turned on so that the user may smoothly proceed with the conversation on the personal audio reproducing device. For example, in the sound output setting for the conversation mode, the volume of the content sound may be set to be lower than in the sound output setting for the simultaneous listening mode. For example, in the sound output setting for the conversation mode, the 3D sound effect may be adjusted so that the content sound is felt to be heard farther than in the sound output setting for the simultaneous listening mode.

In an embodiment, when the conversation mode is performed, only the content sound may be output through the audio processing/sound output unit 250 of each of the personal audio reproducing devices 200a and 200b according to sound output setting for the conversation mode (e.g., low volume, stereoscopic sound effect adjusted to be heard from a distance, ANC function turn-off, transparent mode turn-on, etc.), and the actual conversation voice by the user may be transmitted to the user from the outside of the personal audio reproducing devices 200a and 200b in the form of a naturally uttered voice. In an embodiment, when the conversation mode is performed, the uttered voice from the user may be obtained through the microphone 240 of each of the personal audio reproducing devices 200a and 200b, and the sound according to the obtained uttered voice may be overlaid on the content sound and may be output through the audio processing/sound output unit 250 of each of the personal audio reproducing devices 200a and 200b according to the sound output setting for the conversation mode. When the sound according to the user's uttered voice and the content sound are overlaid and output, the sound output setting for the conversation mode may include 3D sound effect setting considering relative positions and directions between the content providing device 100 and the personal audio reproducing devices 200a and 200b. There may be various sound effect settings that may be set to differ for each mode so that the user may concentrate on the sound of the content or the progress of the conversation. The disclosure is not limited to a specific form. In the drawings and descriptions, it is illustrated and described that each of the first and second personal audio reproducing devices 200a and 200b adjusts and outputs the audio signal received from the content providing device 100 based on the sound output setting for the conversation mode when entering the conversation mode, but the disclosure is not limited thereto. In an embodiment, when entering the conversation mode, the content providing device 100 may generate and transmit an audio signal adjusted according to an output setting for the conversation mode for each of the first and second personal audio reproducing devices 200a and 200b, but the disclosure is not limited to a specific form.

In operation 409, the content providing device 100 may display an indicator indicating that the first and second personal audio reproducing devices 200a and 200b are currently in the conversation mode through the display. In an embodiment, after determining to enter the conversation mode in operation 407, the content providing device 100 may display a predetermined indicator indicating the conversation mode on the display. In an embodiment, the content providing device 100 may display, on the display, each icon indicating each of the first and second personal audio reproducing devices 200a and 200b participating in the conversation mode, in addition to a predetermined indicator indicating the conversation mode. In an embodiment, the content providing device 100 may display an indicator indicating the device on which an utterance is made of the first and second personal audio reproducing devices 200a and 200b participating in the conversation mode. The display of the indicator regarding the progress of the conversation mode by the content providing device 100 is described below in more detail with reference to FIGS. 12 to 21.

In operation 410 of FIG. 4B, a predetermined event indicating a request to end the conversation mode may be detected in the first personal audio reproducing device 200a. There may be various events predetermined to indicate occurrence of a conversation mode end request. Various types of events that may indicate a conversation request and/or a conversation end request is described below. In an embodiment, after detecting that an event indicating a conversation mode end request has occurred, the first personal audio reproducing device 200a may notify the content providing device 100 of the detection result and/or end of the conversation mode. In the drawings, it is illustrated that both the request for the conversation mode and the request for ending the conversation mode occur in the same first personal audio reproducing device 200a, but the disclosure is not limited thereto.

In operation 411, the content providing device 100 may obtain a conversation mode end request from the first personal audio reproducing device 200a and transmit the obtained request to the second personal audio reproducing device 200b. In operation 412, the second personal audio reproducing device 200b may receive a request to end the conversation mode transmitted from the content providing device 100. After obtaining the conversation mode end request in operation 411, in operation 413, the content providing device 100 may determine to end the conversation mode and display a screen for selecting a time point on the timeline of content playback on the display 170. For example, the content providing device 110 may display an option for selecting whether to return to a time point of entering the conversation mode (e.g., a time point stored in operation 407) on the display 170. In this regard, an exemplary screen display illustrated in FIG. 7 may be referred to.

Figure 7:
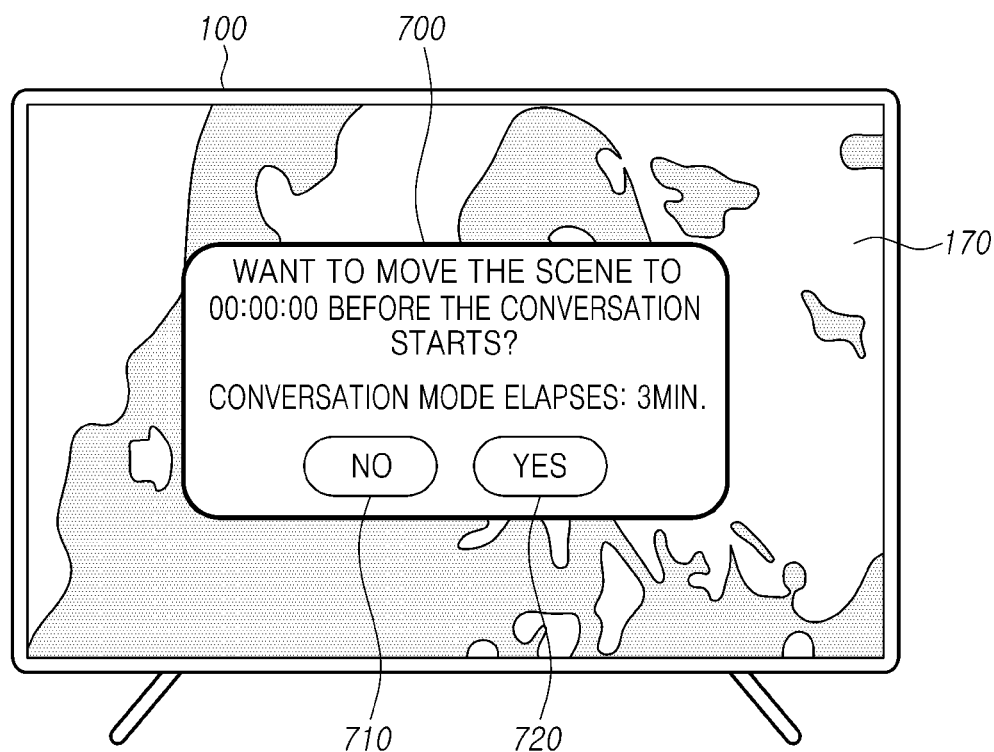
FIG. 7 is a view illustrating an example screen displayed on a display of a content providing device during a conversation mode release process according to an embodiment of the disclosure.

FIG. 7 is a view illustrating an example screen displayed on a display of a content providing device during a conversation mode release process according to an embodiment of the disclosure.

As illustrated, a selection window 700 is displayed and provided on the display 170 of the content providing device 100. As illustrated, in the selection window 700, selection buttons 710 and 720 for selecting whether to move the content playback time point to a time point (e.g., a time point three minutes before the conversation mode starts) are displayed, along with guidance on the time (e.g., three minutes) when the conversation mode is performed. In an embodiment, the user of the first or second personal audio reproducing devices 200a and 200b may select one of the selection buttons 710 and 720 by an input means provided in the first or second personal audio reproducing device 200a or 200b or a separate control device (e.g., a remote controller). According to the user's selection, the playback time point on the timeline of the content may go back to the conversation mode start time point.

Returning back to FIG. 4B, in operation 414, e.g., the first personal audio reproducing device 200a may select a playback time point of the content through an option provided by the content providing device 100 in operation 413. In an embodiment, the first personal audio reproducing device 200*a* may select to return to the time point of entering the conversation mode. In an embodiment, the first personal audio reproducing device 200*a* may select to continue proceeding from the current time point without going back to the timeline for content playback. In the drawings, it is illustrated that the content playback time point is selected by the first personal audio reproducing device 200*a*, but the disclosure is not limited thereto.

In operation 415, the content providing device 100 may adjust the content playback time point to move back according to selection from the first personal audio reproducing device 200*a* performed in operation 414. In operation 416, the content providing device 100 may continue to play the content from the time point adjusted on the timeline, and may stream and transmit the content audio signal to both sides of the first and second personal audio reproducing devices 200*a* and 200*b* in the simultaneous listening mode. In operation 417, each of the first and second personal audio reproducing devices 200*a* and 200*b* may receive the content audio signal from the content providing device 100 and may output content sound based on the received signal in the simultaneous listening mode. In an embodiment, each of the first and second personal audio reproducing devices 200*a* and 200*b* may output the content sound according to a sound output setting preset for the simultaneous listening mode. The sound output setting used in operation 417 may be the same setting used for sound output of each of the first and second personal audio reproducing devices 200*a* and 200*b* in operation 403, but the disclosure is not limited thereto.

Figure 8:
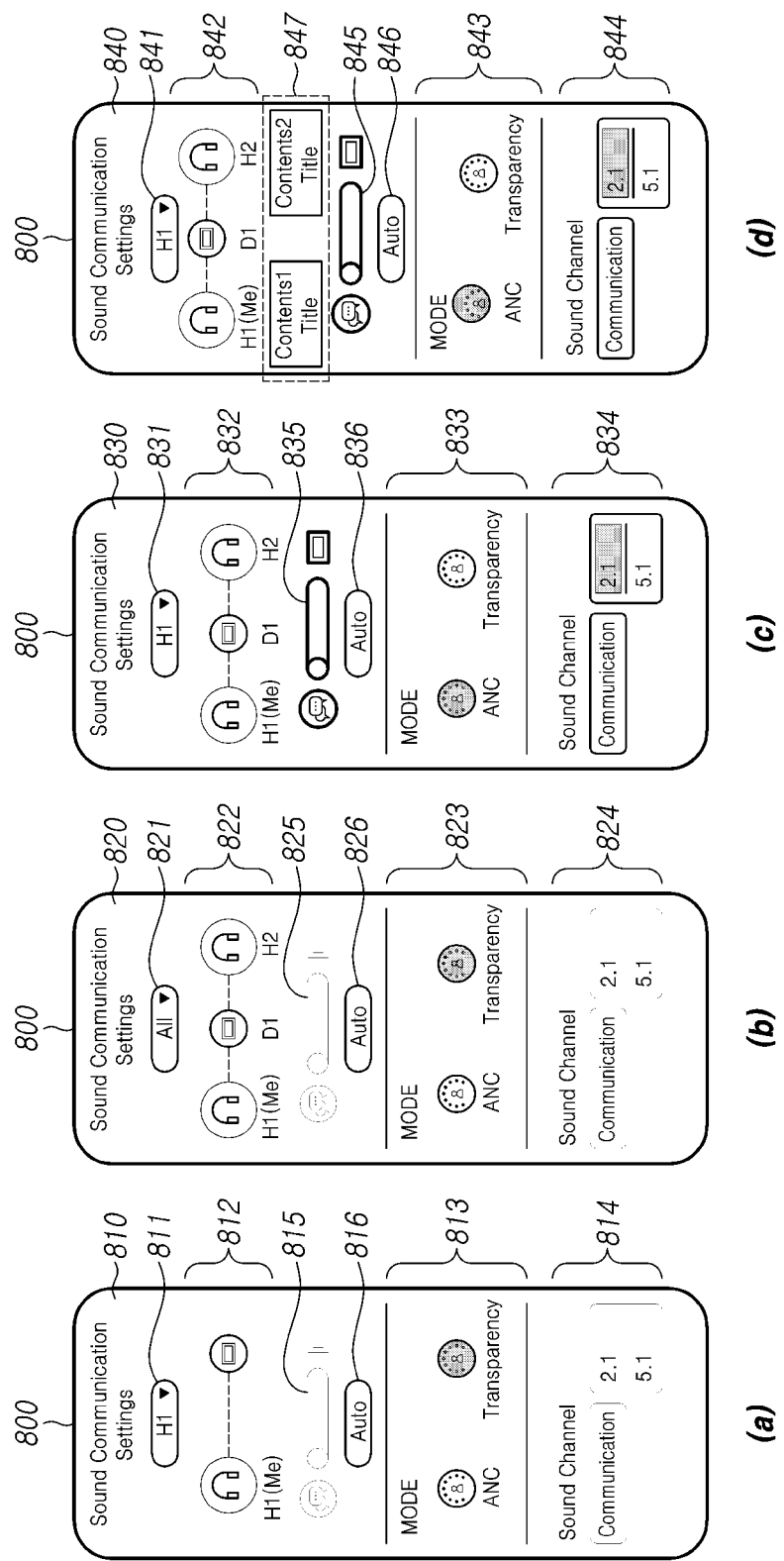
FIG. 8 is a view illustrating example user interfaces for displaying and/or changing sound output setting for a personal audio reproducing device to be used in a conversation mode according to an embodiment of the disclosure.

FIG. 8 is a view illustrating example user interfaces for displaying and/or changing sound output setting for a personal audio reproducing device to be used in a conversation mode according to an embodiment of the disclosure.

FIG. 8(*a*) to (*d*) illustrate exemplary user interfaces 810, 820, 830, and 840, respectively, that may be displayed on a mobile terminal 800. In an embodiment, the mobile terminal 800 on which each user interface is displayed may be a content providing device (e.g., the content providing device 100 described above with reference to FIGS. 1 to 6) that provides an audio content signal to each personal audio reproducing device, but the disclosure is not limited thereto. In an embodiment, the mobile terminal 800 may be a personal communication device that is connected to a personal audio reproducing device and supports communication with the outside, but the disclosure is not limited thereto. As illustrated, each of the first and second personal audio reproducing devices H1 and H2 may be communicatively connected to the mobile terminal 800. The first and second personal audio reproducing devices H1 and H2 may correspond to the first and second personal audio reproducing devices 200*a* and 200*b*, respectively, described above with reference to FIGS. 1 to 6.

Referring to FIG. 8(*a*), a user interface screen 810 for the sound output setting for the conversation mode for the first personal audio reproducing device H1 is illustrated. At the top of the screen 810, a selection item 811 for selecting a device to be set is displayed, and it is displayed that the first personal audio reproducing device H1 is currently selected. A visual indicator 812 indicating that the first personal audio reproducing device H1 is connected to the mobile terminal 800 is displayed under the selection item 811.

In the middle of the screen 810, a selection item 813 supporting selection of whether to activate each of the ANC function and the transparency function in the first personal audio reproducing device H1 is displayed when the conversation mode is performed. As illustrated, in the current sound output setting for the conversation mode for the first personal audio reproducing device H1, the ANC mode is set to be deactivated (marked as non-selected) and the transparency mode is set to be activated (marked in bold as selected). This setting may be changed by user selection. According to an embodiment, in the conversation mode, the sound according to the conversation voice may be transmitted to the counterpart user in the form of natural utterance without passing through each personal audio reproducing device H1. In this case, the ANC mode may be deactivated and the transparency mode may be activated to enable smooth conversation.

According to an embodiment, in the conversation mode, the sound according to the conversation voice may be overlaid with the content sound from the content providing device and may be output and transmitted through the speaker of each personal audio reproducing device. In such a case, when the conversation mode is performed, a selection item 814 for selecting a setting for a 3D sound effect for the output sound according to the conversation voice, available on the first personal audio reproducing device H1, is displayed at the bottom of the screen 810. As illustrated, in the conversation mode, the selection item 814 on the screen 810 is deactivated in case the sound according to the conversation voice is transmitted to the user in the form of natural utterance rather than passing through each personal audio reproducing device H1. Further, as described above, when the sound according to the conversation voice is overlaid with the content sound in the conversation mode and is output and transmitted through the speaker of each personal audio reproducing device, a selection bar 815 for setting how to distribute the volume of the sound output from the first personal audio reproducing device H1 between the conversational sound and the content sound when the conversation mode proceeds is displayed under the indicator 812. As illustrated, like the selection item 814, the selection bar 815 is deactivated. A selection item 816 for selecting whether to perform automatic setting based on existing user data stored in the mobile terminal 800 is displayed under the selection bar 815.

FIG. 8(*b*) illustrates a user interface screen 820 for collectively setting or changing sound output setting for the conversation mode when a plurality of personal audio reproducing devices H1 and H2 are connected to the mobile terminal 800. At the top of the screen 820, a selection item 821 for selecting a device to be set is displayed, and it is displayed that all the devices are currently selected. A visual indicator 822 indicating that the first and second personal audio reproducing devices H1 and H2 are connected to the mobile terminal 800 is displayed under the selection item 821.

As in the case of the screen 810, the user interface shown on the screen 820 is also prepared for the case in which the sound according to the conversation voice is transmitted to the user in the form of a natural utterance without passing through each personal audio reproducing device H1 or H2 in the conversation mode. As illustrated, each setting on the screen 820 is similar to that illustrated on the screen 810, and a detailed description thereof will be omitted. The screen 810 is a setting screen for the first personal audio reproducing device H1, whereas the setting (or setting change) on the screen 820 is different in that it is applied to all connected personal audio reproducing devices H1 and H2.

FIG. 8(*c*) illustrates a user interface screen 830 supporting sound output setting for the conversation mode for all personal audio reproducing devices H1 and H2 connected to the mobile terminal 800. At the top of the screen 830, a selection item 831 for selecting a device to be set is displayed, and it is displayed that all the devices are currently selected. A visual indicator 832 indicating that the first and second personal audio reproducing devices H1 and H2 are connected to the mobile terminal 800 is displayed under the selection item 831. Unlike the screens 810 and 820, the user interface shown on the screen 830 relates to a case in which, in the conversation mode, the sound according to the conversation voice is overlaid with the content sound from the content providing device and is output through the audio processing/sound output unit 250 of each personal audio reproducing device H1 and H2. The screen 810 is a setting screen for the first personal audio reproducing device H1, whereas the setting (or setting change) on the screen 830 is different in that it is applied to all connected personal audio reproducing devices H1 and H2.

In the middle of the screen 830, a selection item 833 supporting selection of whether to activate each of the ANC function and the transparency function in the first and second personal audio reproducing devices H1 and H2 is displayed when the conversation mode is performed. As illustrated, in the current sound output setting for the conversation mode for the first and second personal audio reproducing devices H1 and H2, the ANC mode is set to be deactivated (marked in bold as selected) and the transparency mode is set to be deactivated (marked as non-selected). This setting may be changed by user selection.

In the lower area of the screen 830, a selection item 834 for supporting setting of a 3D sound effect for sound according to the conversation voice, available in each of the personal audio reproducing devices H1 and H2 for the conversation sound when the conversation mode is performed, is displayed. As illustrated, in the conversation mode, a 2.1-channel 3D sound effect will be applied to the sound according to the user conversation voice.

A selection bar 835 for setting how to distribute the volume of the sound output from each of the personal audio reproducing devices H1 and H2 between the conversation sound and the content sound when the conversation mode is performed is displayed under the indicator 832. As illustrated, the selection bar 835 is completely moved toward the side indicating the conversation mode, and the current setting indicates that the user will focus on the conversation mode as much as possible when the conversation mode proceeds. In this case, in the actual sound output through the audio processing/sound output unit 250, the content sound may be output in low volume as determined by the system, and the sound according to the user voice may be output in high volume. The user may adjust the distribution of volumes on both sides by adjusting the selection bar 835. Like screens 810 and 820, a selection item 836 for selecting whether to perform automatic setting based on existing user data stored in the mobile terminal 800 is displayed under the selection bar 835.

FIG. 8(*d*) illustrates a user interface screen 840 supporting sound output setting for the conversation mode for all personal audio reproducing devices H1 and H2 connected to the mobile terminal 800. At the top of the screen 840, a selection item 841 for selecting a device to be set is displayed, and it is displayed that all the devices are currently selected. A visual indicator 842 indicating that the first and second personal audio reproducing devices H1 and H2 are connected to the mobile terminal 800 is displayed under the selection item 841.

According to an embodiment, each of the personal audio reproducing devices H1 and H2 connected to the mobile terminal 800 may receive and output different audio content. In this case, audio content received and output by each device may be selected, and the reference numeral 847 on the screen 840 indicates an item enabling such selection. Since the screen 840 is similar to that illustrated in the screen 830 except that the screen 840 further includes the item indicated by the reference numeral 847, a detailed description thereof will be omitted.

Although an example is described in connection with FIG. 8 in which each exemplary user interface for displaying and/or changing a sound output setting for a personal audio reproducing device is provided through a mobile terminal, the disclosure is not limited thereto. According to an embodiment, each of the above-described user interfaces may be communicatively connected to the personal audio reproducing device and displayed on another separate device including the display, e.g., a TV device providing audio content, or the like.

Figure 9:
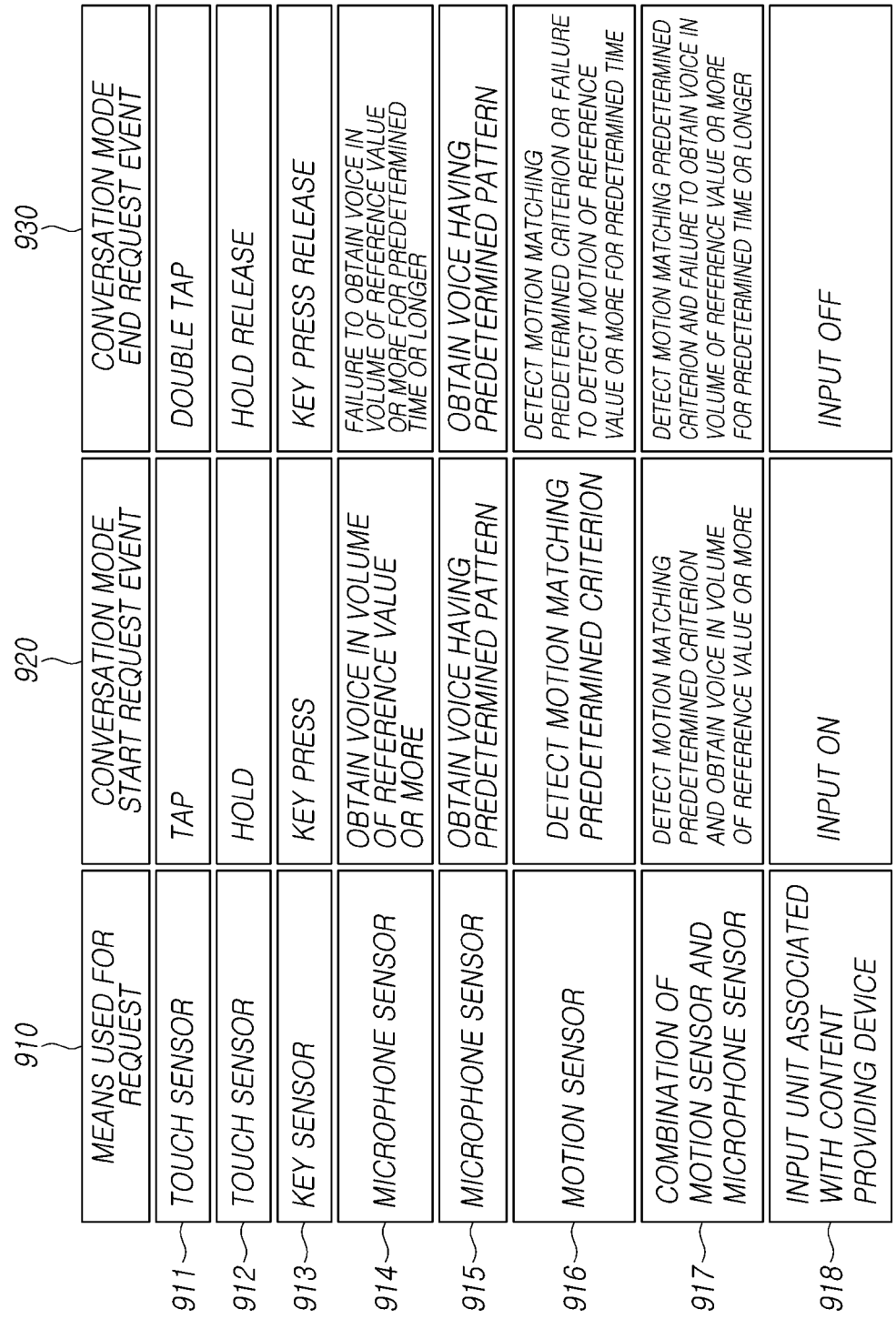
FIG. 9 is a table enumerating example events that may be used as a conversation mode start request occurring during a simultaneous listening mode and a conversation mode end request occurring during a conversation mode on a personal audio reproducing device according to an embodiment of the disclosure.

FIG. 9 is a table enumerating example events that may be used as a conversation mode start request occurring during a simultaneous listening mode and a conversation mode end request occurring during a conversation mode on a personal audio reproducing device according to an embodiment of the disclosure.

As illustrated, the column 910 enumerates means that may be used for each request event are listed, and the column 920 and the column 930 show whether a certain event occurring on each means indicates a request to start the conversation mode or a request to end the conversation mode. Each item shown in FIG. 9 is merely an example, but the disclosure is not limited thereto.

First, the rows 911 and 912 indicate that a touch sensor is used to input an event, a tap or a hold is used as a conversation mode start request event, and a double tap or hold release is used as a conversation mode end request event. The row 913 indicates that a key sensor is used to input an event, and a key press and key press release are used as conversation mode start request and conversation mode end request events, respectively. In an embodiment, each of the personal audio reproducing devices 200*a* and 200*b* may include a button or key provided for a conversation mode start request and an end request, but the disclosure is not limited thereto.

The row 914 indicates that a microphone sensor is used to input an event, and obtaining an audio of a volume equal to or larger than a reference value is used as a conversation start request event, and failure to obtain an audio of a volume equal to or larger than the reference value for a predetermined time after the conversation mode starts is used as a conversation mode end request event. The row 915 indicates that a microphone sensor is used to input an event, and obtaining a voice having a predetermined pattern is used as each of the conversation start request and conversation mode end request event.

The row 916 indicates that a motion sensor (e.g., an acceleration sensor, a geomagnetic sensor, an IMU sensor, a gyro sensor, etc.) is used to input an event, and detecting a motion matching a predetermined criterion is used as a conversation start request event, and failure to detect a motion of a reference value or more for a predetermined time after the conversation mode starts or detecting another motion matching a predetermined criterion is used as a conversation mode end request event. In an embodiment, each of the personal audio reproducing devices 200*a* and 200*b* may include one or more motion sensors. According to an embodiment, each motion obtained based on the above-described motion sensor may be defined as a motion that may be compared with the predetermined criterion corresponding to the conversation mode start/end request in relation to the row 916 (the matters listed here are only examples, but the disclosure is not limited to the specific form). In an embodiment, the personal audio reproducing devices 200a and 200b may determine, by using the provided motion sensor, whether a straight line connecting the speakers on both sides of the corresponding device is rotated by a predetermined angle or more in a state of being horizontal to the ground (e.g., when the user turns the head from side to side by a predetermined angle or more) or whether such a straight line is rotated by a predetermined angle or more in a direction of being horizontal to the ground (e.g., when the user turns the head by a predetermined angle or more toward the position of the counterpart device when the position of the counterpart device is known). According to an embodiment, each motion obtained based on the above-described motion sensor may be defined as a motion that may be compared with the predetermined criterion corresponding to the conversation mode start/end request in relation to the row 916 (the matters listed here are only examples, but the disclosure is not limited to the specific form). In an embodiment, the personal audio reproducing devices 200a and 200b may monitor positions of each other by transmitting and receiving signals according to a short-range wireless communication scheme, and the monitoring result may be used to determine whether to move in the above-described specific direction.

As in the row 917, a plurality of events generated through a plurality of means may be combined and treated as a conversation mode start request and a conversation mode end request event. In the row 917, it is defined that a conversation mode start request is generated when a motion that meets a certain criterion as in the row 916 is detected while a voice signal of a volume equal to or larger than a reference value is obtained by using both the microphone and the motion sensor. Also, in the row 917, it is defined that a conversation mode end request is generated when a motion that meets a certain criterion, such as in the row 916, is detected while a voice signal of a volume equal to or larger than a reference value is not obtained for a certain period of time or longer after the conversation mode is started. When a plurality of conditions are combined and used as described above, the conversation mode may be prevented from being initiated differently from the user's intention.

In the rows 911 to 917, it has been described that a conversation mode start request and a conversation mode end request are detected through the sensor means provided in each of the personal audio reproducing devices 200a and 200b. In contrast, in the row 918, it may be defined that a conversation mode start request event or end request event occurs according to an on/off input of an input unit associated with the content providing device 100, e.g., a remote controller.

The events defined to indicate the conversation mode start request and the conversation mode end request listed in FIG. 9 are merely exemplary, but the disclosure is not limited to a specific form.

Figure 10:
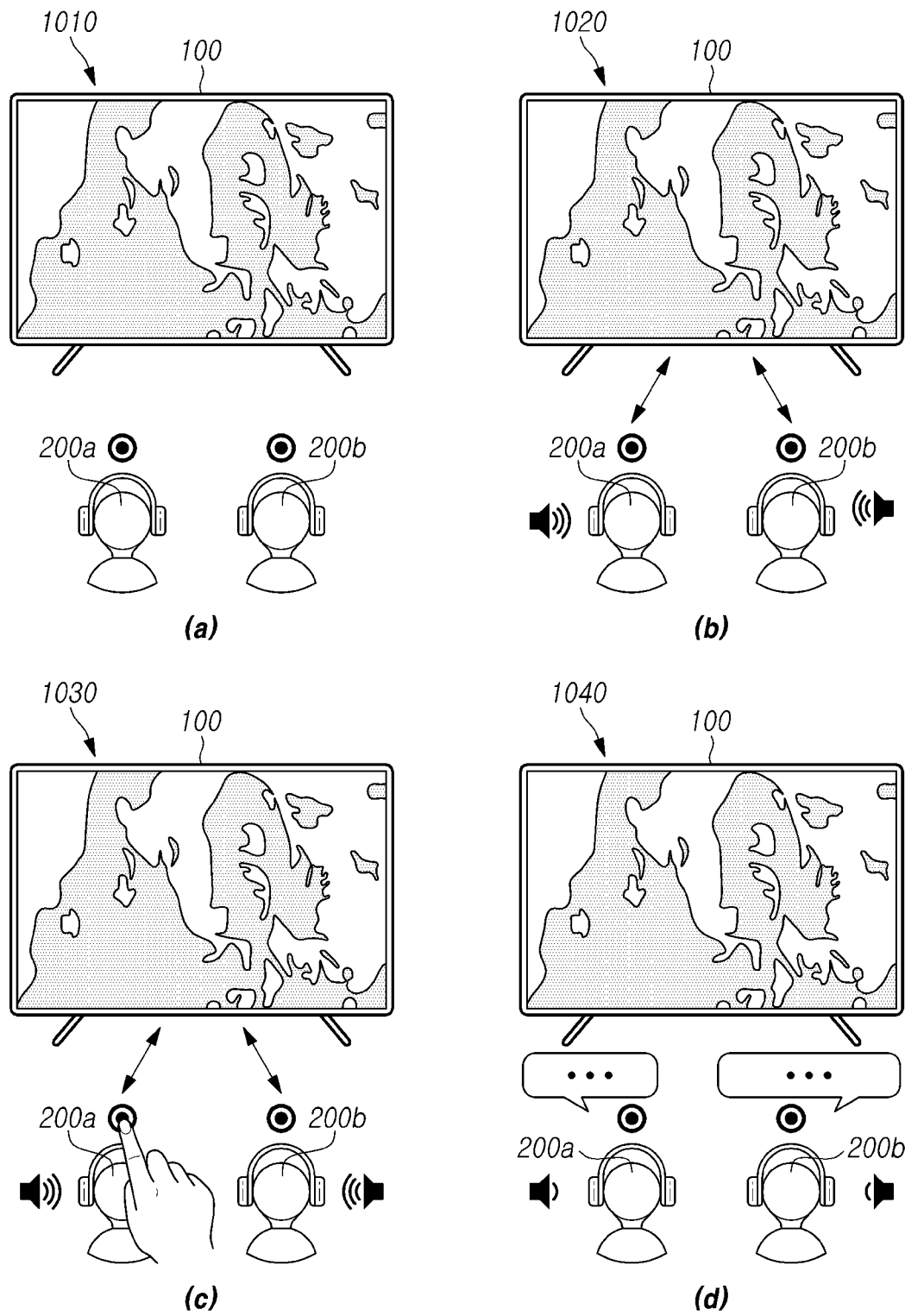
FIG. 10 is a view illustrating a case in which a conversation mode starts and proceeds according to a button input according to an embodiment of the disclosure.

FIG. 10 is a view illustrating a case in which a conversation mode starts and proceeds according to a button input according to an embodiment of the disclosure.

As illustrated, each of the personal audio reproducing devices 200a and 200b (e.g., user headphones) are communicatively connected to the content providing device 100 (e.g., TV). In the context 1010, each of the personal audio reproducing devices 200a and 200b having requested access is displayed, to be selectable, on the display 170 of the content providing device 100 in the process of establishing communication connection with each of the personal audio reproducing devices 200a and 200b. In the context 1020, each of the personal audio reproducing devices 200a and 200b and the content providing device 100 enter the simultaneous listening mode, and the users enjoy content from the same content providing device 100 through their respective personal audio reproducing devices 200a and 200b. In the context 1030, the user of the personal audio reproducing device 200a may trigger a conversation mode request start event by clicking a conversation button provided in the device. In the context 1040, the conversation mode may be initiated, and each of the audio reproducing devices 200a and 200b may output sound based on the content audio signal from the content providing device 100 according to the sound output setting (e.g., volume reduction, etc.) changed to fit the conversation mode. In an embodiment, each user may recognize the voice input (e.g., "What is that actor's name?" or "Woo Young-woo") of the counterpart user from the outside while receiving the content sound signal provided according to the conversation mode sound output setting through each personal audio reproducing device 200a or 200b. In another example, the sound based on the voice signal obtained from each user through the microphone of each of the personal audio reproducing devices 200a and 200b may be overlaid with the sound of the content audio signal from the content providing device 100 and output through each of the personal audio reproducing devices 200a and 200b according to the conversation mode sound output setting.

Figure 11:
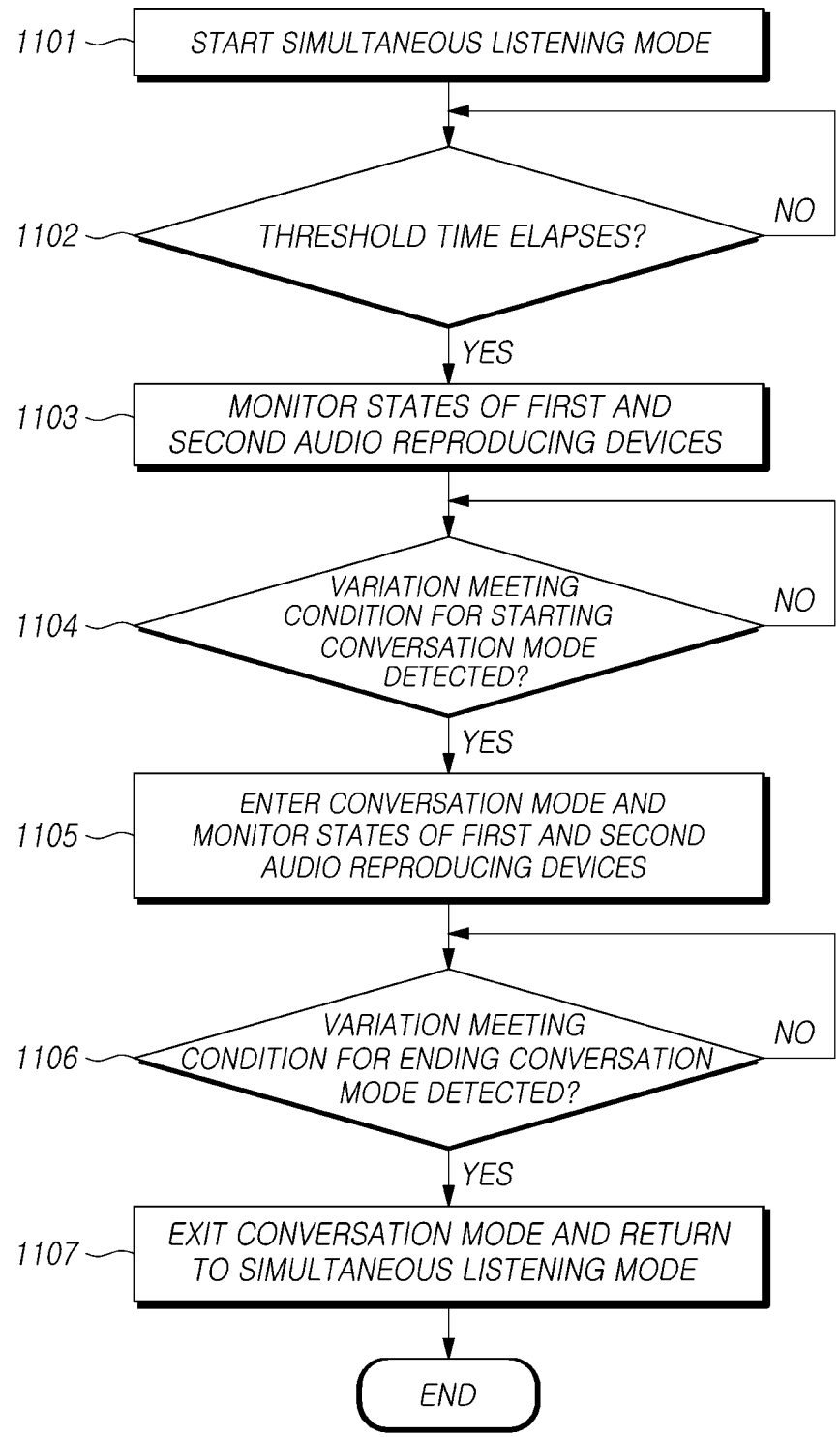
FIG. 11 is a flowchart schematically illustrating operations when a conversation mode starts and ends as a predetermined variation occurs which is detected on a personal audio reproducing device according to an embodiment of the disclosure.
Figure 12:
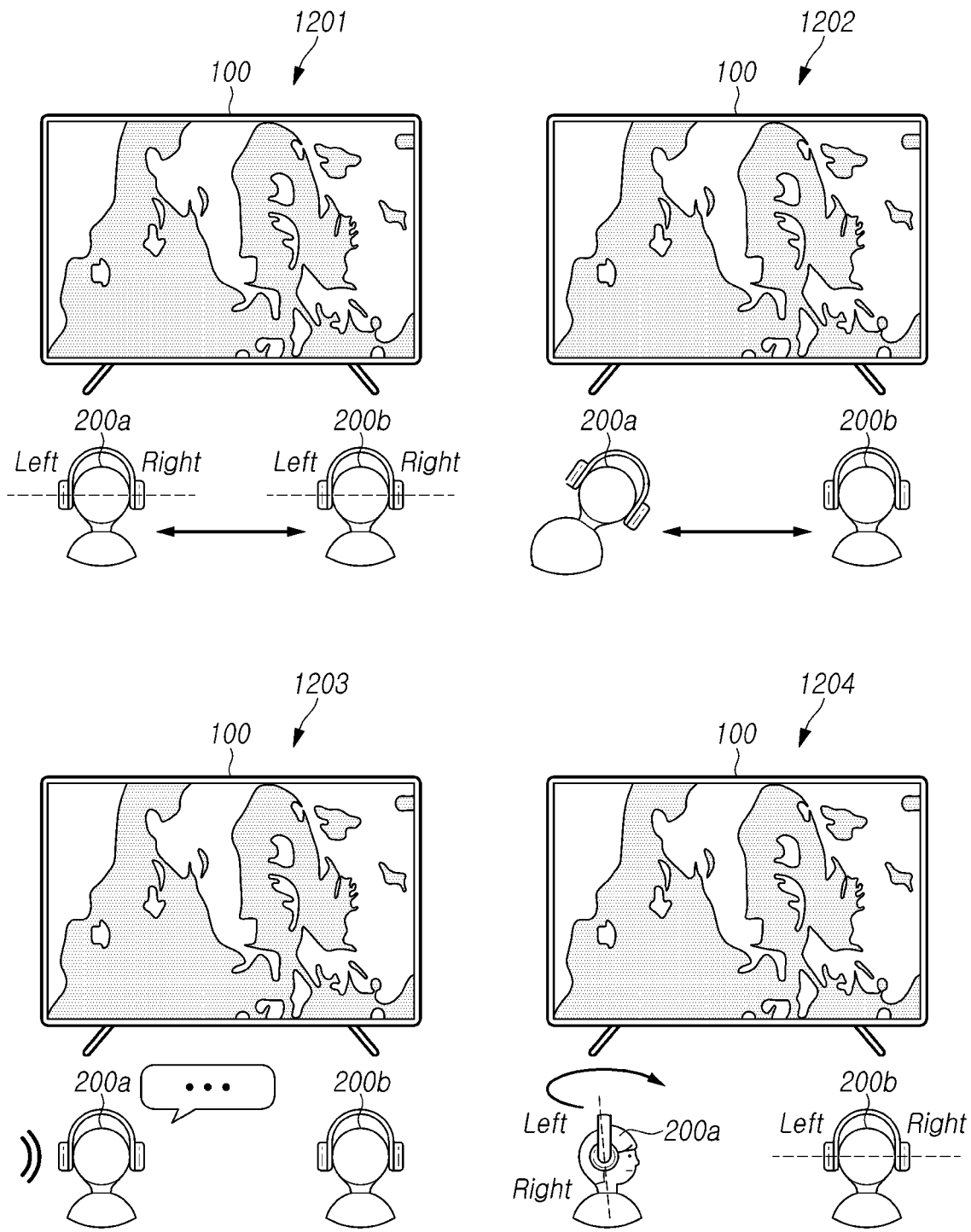
FIG. 12 is a view illustrating example variations that may occur on a personal audio reproducing device, recognizable as start of a conversation mode according to an embodiment of the disclosure.

FIG. 11 is a flowchart schematically illustrating operations when a conversation mode starts and ends as a predetermined variation occurs which is detected on a personal audio reproducing device according to an embodiment of the disclosure. FIG. 12 is a view illustrating example variations that may occur on a personal audio reproducing device, recognizable as start of a conversation mode according to an embodiment of the disclosure.

Referring to FIG. 11, the simultaneous listening mode is started in operation 1101. For example, as illustrated in reference numeral 1201 of FIG. 12, the users may wear personal audio reproducing devices 200a and 200b, respectively, and enjoy content provided from the content providing device 100. The personal audio reproducing devices 200a and 200b may play the content sound according to the audio content signal received from the content providing device 100 according to the sound output setting determined for the simultaneous listening mode and output the content sound through the respective provided speakers.

In operation 1102, it may be determined whether a threshold time elapses. Thereafter, in determining whether to start the conversation mode according to the state monitoring result of each personal audio reproducing device, there may be relatively many motions for some time at the beginning of the simultaneous listening mode (e.g., the beginning of the user wearing headphones and starting to watch TV), and thus the switching to the conversation mode is suspended for a predetermined threshold time until the simultaneous listening mode is stabilized.

After the threshold time elapses in operation 1102, the state change in each of the personal audio reproducing devices 200a and 200b may be monitored by proceeding to operation 1103. For example, as described above, each of the personal audio reproducing devices 200a and 200b may track and monitor each other's positions or directions by transmitting and receiving signals through the short-range communication module (e.g., UWB module). In an embodiment, each of the personal audio reproducing devices 200a and 200b may recognize the position of the content providing device 100 by a short-range communication scheme. In an embodiment, each audio reproducing device 200a and 200b may include a microphone 240 and may obtain a voice input through the microphone 240. In an embodiment, each audio reproducing device may track and monitor motion, rotation, tilt, and the like of the corresponding device through the motion sensor unit 270 provided therein. In an embodiment, each of the personal audio reproducing devices 200a and 200b may combine the position of the counterpart device 200b or 200a being tracked and monitored, the position of the content providing device 100, the motion detected on the corresponding audio reproducing device 200a or 200b, and the like to monitor variations in various information, such as the distance between the corresponding personal audio reproducing device 200a or 200b and the content providing device 100, the distance between the corresponding audio reproducing device and the counterpart device, the distance between the corresponding audio reproducing device and the counterpart device, and the angle between the corresponding audio reproducing device (e.g., the straight line by both speakers) and the counterpart device (e.g., the straight line by both speakers of the counterpart device). In an embodiment, each audio reproducing device may include a proximity sensor and may detect the proximity between the content providing device and/or the counterpart device.

In operation 1104, it may be determined whether a variation that satisfies the criterion for requesting to start the conversation mode has occurred based on the monitoring result in operation 1102. In an embodiment, as the criterion for requesting to start the conversation mode, e.g., when the audio reproducing devices 200a and 200b are inclined toward the counterpart device by a reference value or more (see reference numeral 1202 in FIG. 12), when the audio reproducing devices 200a and 200b are moved toward the content providing device by a reference value or more, when the audio reproducing devices 200a and 200b are moved toward the counterpart device by a reference value or more, and when the volume of the voice obtained from the audio reproducing devices 200a and 200b through the microphone 240 is the reference value or more (see reference numeral 1202 in FIG. 12), or when the angle between the audio reproducing devices 200a and 200b and the counterpart devices 200b and 200a is reduced (e.g., see reference numeral 1204 of FIG. 12), or other various criteria may be defined, but the disclosure is not limited to a specific form.

When it is determined in operation 1104 that a change satisfying the criteria for requesting to start the conversation mode has occurred, in operation 1105, each of the personal audio reproducing devices 200a and 200b and the content providing device 100 may enter the conversation mode. The users may wear the personal audio reproducing devices 200a and 200b, respectively, and enjoy the content provided from the content providing device 100, while simultaneously conducting a conversation with the user of the counterpart device. In an embodiment, the personal audio reproducing devices 200a and 200b may play the content sound according to the audio content signal received from the content providing device 100 according to the sound output setting determined for the conversation mode and output the content sound through the respective provided speakers. In an embodiment, the personal audio reproducing devices may also overlay the conversation sound based on the conversation voice obtained by the microphone of each of the personal audio reproducing devices 200a and 200b with the content sound based on the content signal from the content providing device 100 and output it through the speaker.

In operation 1105, state changes in the personal audio reproducing devices 200a and 200b may be continuously tracked and monitored while the conversation mode proceeds. This is to detect a state change for determining whether a request to end the conversation mode has occurred. The state to be tracked and monitored may be the same as or similar to those monitored to determine whether there is a request to enter the conversation mode in operation 1103, but the disclosure is not limited to a specific form.

In operation 1106, it may be determined whether a variation that satisfies the criterion for requesting to end the conversation mode has occurred based on the monitoring result in operation 1105. In an embodiment, as the criterion for requesting to end the conversation mode, e.g., when the audio reproducing devices 200a and 200b are moved back away by the reference value or more from the position inclined toward the counterpart device by the reference value or more, when the audio reproducing devices 200a and 200b are moved away from the content providing device by the reference value or more, when the audio reproducing devices 200a and 200b are moved away from the counterpart device by the reference value or more, and when no voice having the reference volume or more is obtained from the audio reproducing devices 200a and 200b through the microphone 240 for a predetermined time or longer, or when the angle between the audio reproducing devices 200a and 200b and the counterpart devices 200b and 200a is increased by a reference value or more, or other various criteria may be defined.

FIGS. 13 to 16 are views illustrating contexts in which an indicator indicating the progress of a conversation is displayed on a display of a content providing device when a conversation mode is performed between users through two personal audio reproducing devices each connected to a content providing device according to an embodiment of the disclosure.

Figure 13:
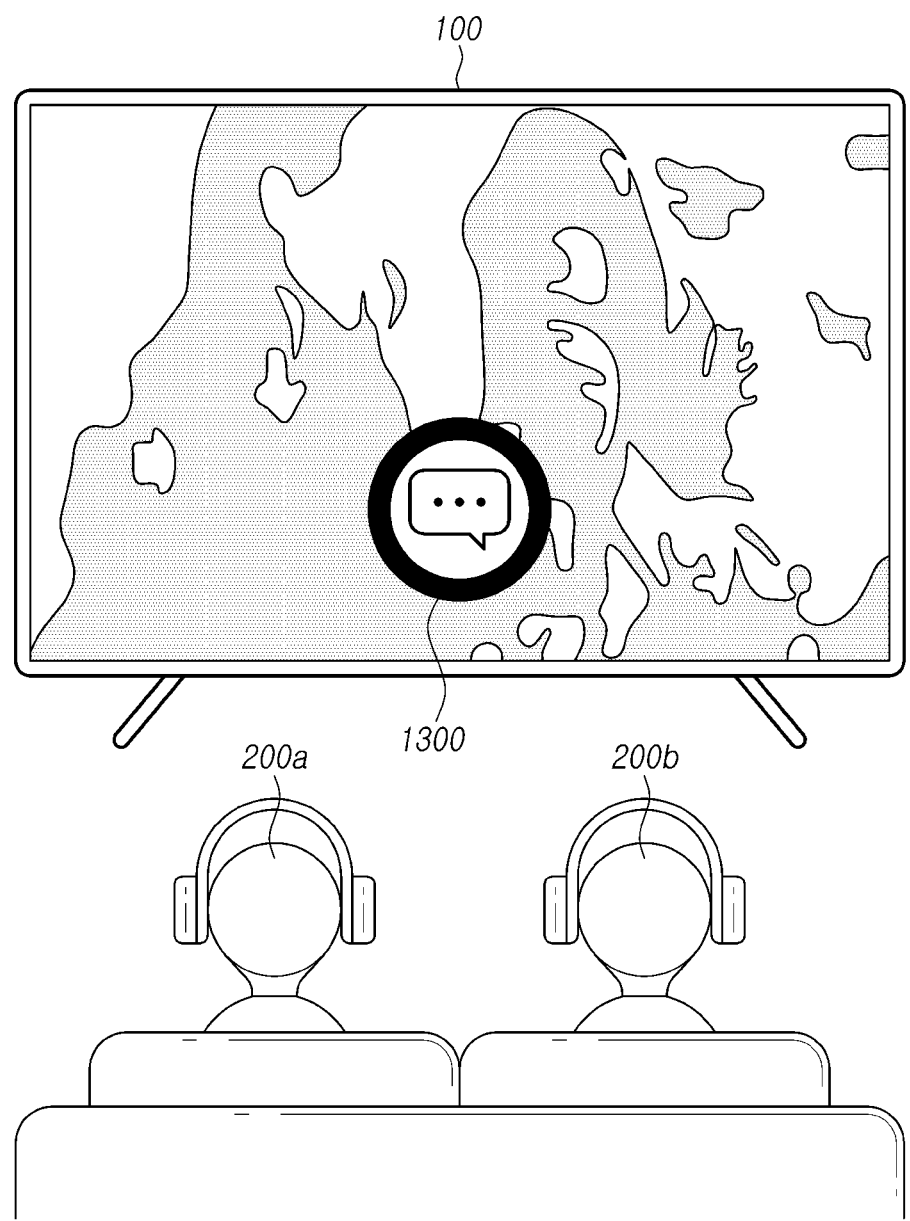
FIGS. 13 to 16 are views illustrating contexts in which an indicator indicating the progress of a conversation is displayed on a display of a content providing device when a conversation mode is performed between users through two personal audio reproducing devices each connected to a content providing device according to an embodiment of the disclosure.

FIG. 13 illustrates a state in which users who view content through personal audio reproducing devices 200a and 200b respectively connected to the content providing device 100 enter a conversation mode from a simultaneous listening mode. As illustrated, the content providing device 100 may be a TV device. In FIG. 13, an indicator 1300 indicating that the personal audio reproducing devices 200a and 200b have just entered the conversation mode is displayed on the display of the content providing device 100. The illustrated indicator 1300, unlike the case described below with reference to FIGS. 14 to 16, does not indicate which device no utterance is made on.

Figure 14:
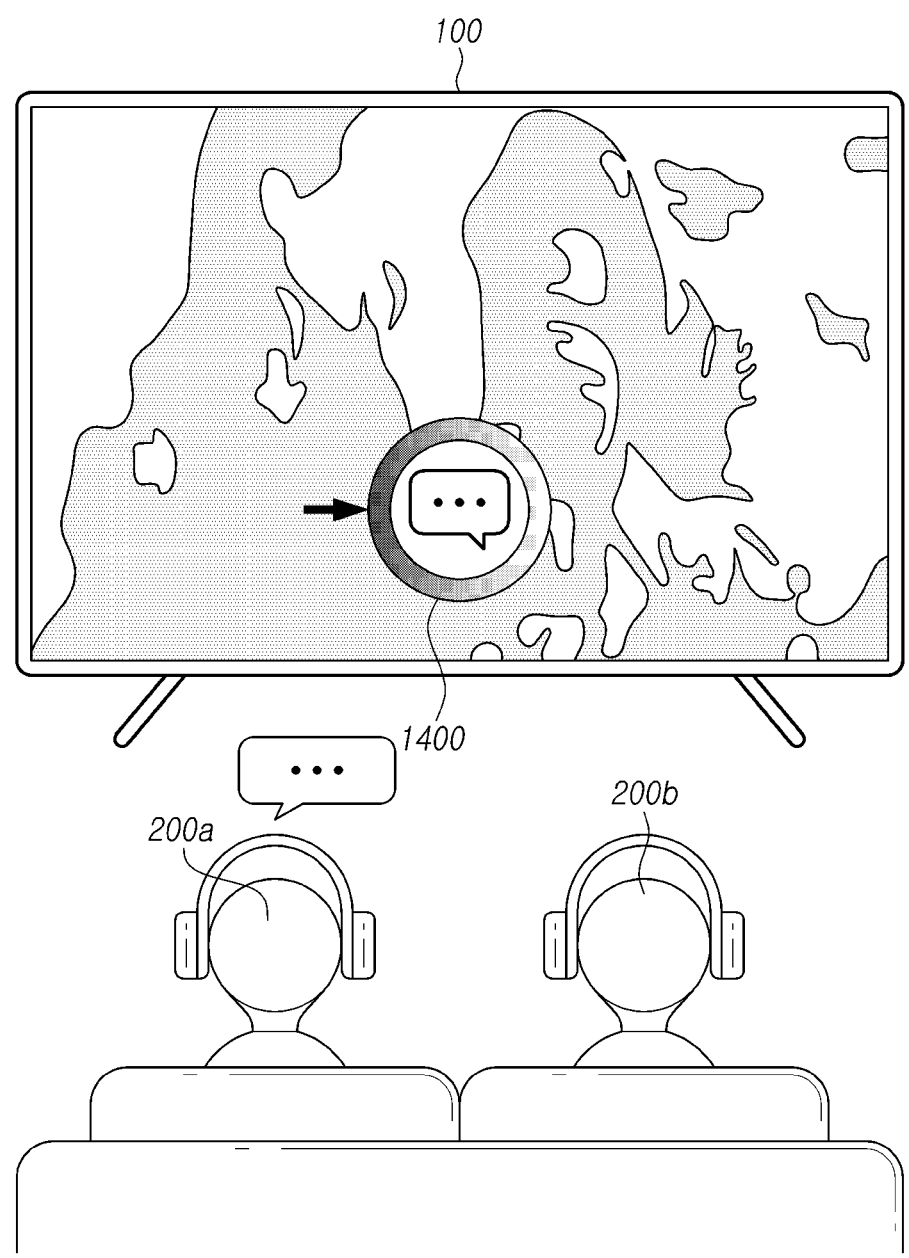

FIG. 14 illustrates a case in which an indicator 1400 is displayed on the content providing device 100 to indicate the device where an utterance is made by the user of the personal audio reproducing device 200a as the conversation mode proceeds. As described above, in an embodiment, the content providing device 100 and each of the personal audio reproducing devices 200a and 200b may recognize positions of each other according to a short-range wireless communication protocol. In an embodiment, the content providing device 100 may recognize the relative directions of both the personal audio reproducing devices 200a and 200b. As illustrated, the personal audio reproducing device 200a may be positioned on the left side of the content providing device 100 (in the direction in which the display is viewed vertically), and the indicator 1400 includes a left arrow to indicate that an utterance is made on the left personal audio reproducing device 200a.

Figure 15:
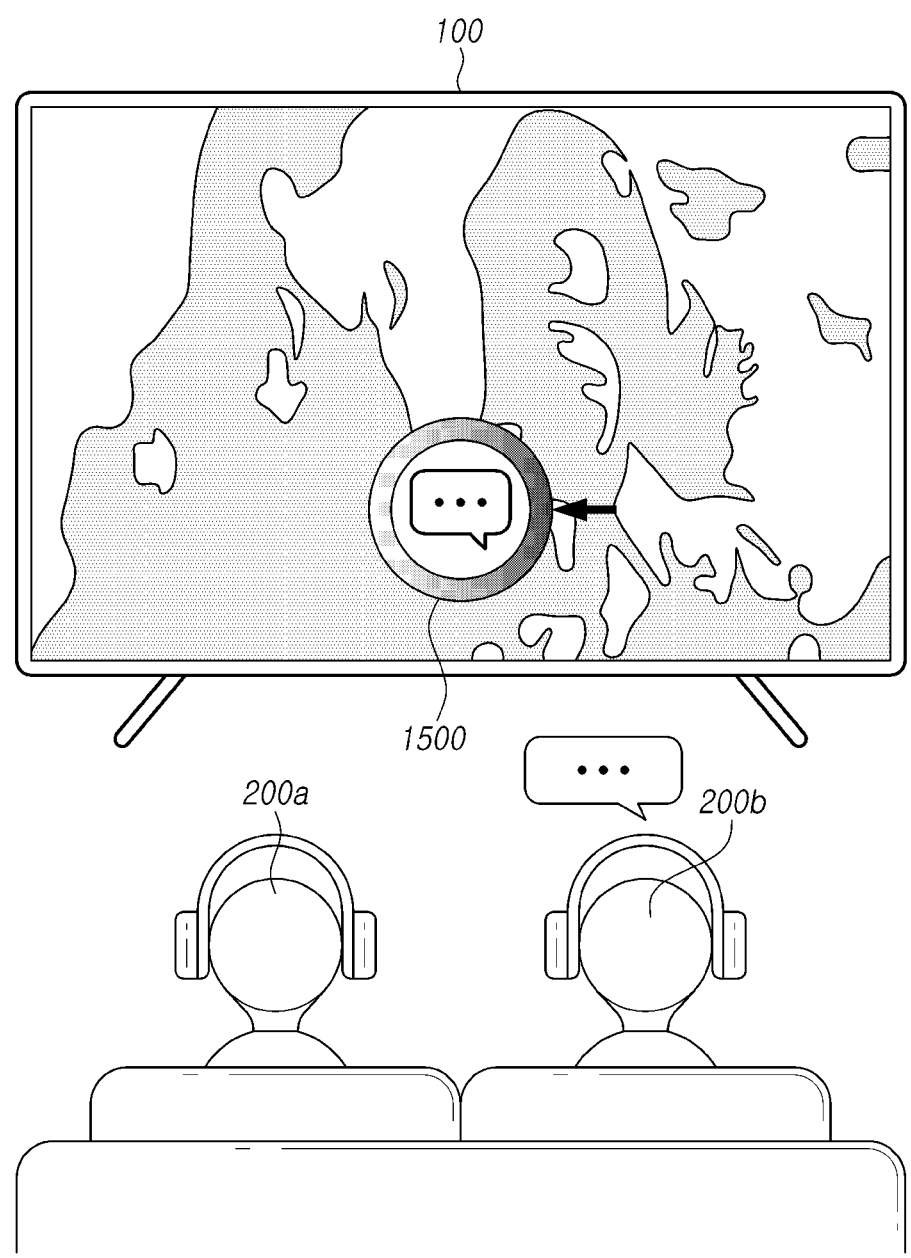

FIG. 15 illustrates a case in which an indicator 1500 is displayed on the content providing device 100 to indicate the device where an utterance is made by the user of the personal audio reproducing device 200b as the conversation mode proceeds. As described above, the content providing device 100 may recognize the relative directions of both the personal audio reproducing devices 200a and 200b. As illustrated, the personal audio reproducing device 200b may be positioned on the right side of the content providing device 100 (in the direction in which the display is viewed vertically), and the indicator 1500 includes a right arrow to indicate that an utterance is made on the left personal audio reproducing device 200b.

Figure 16:
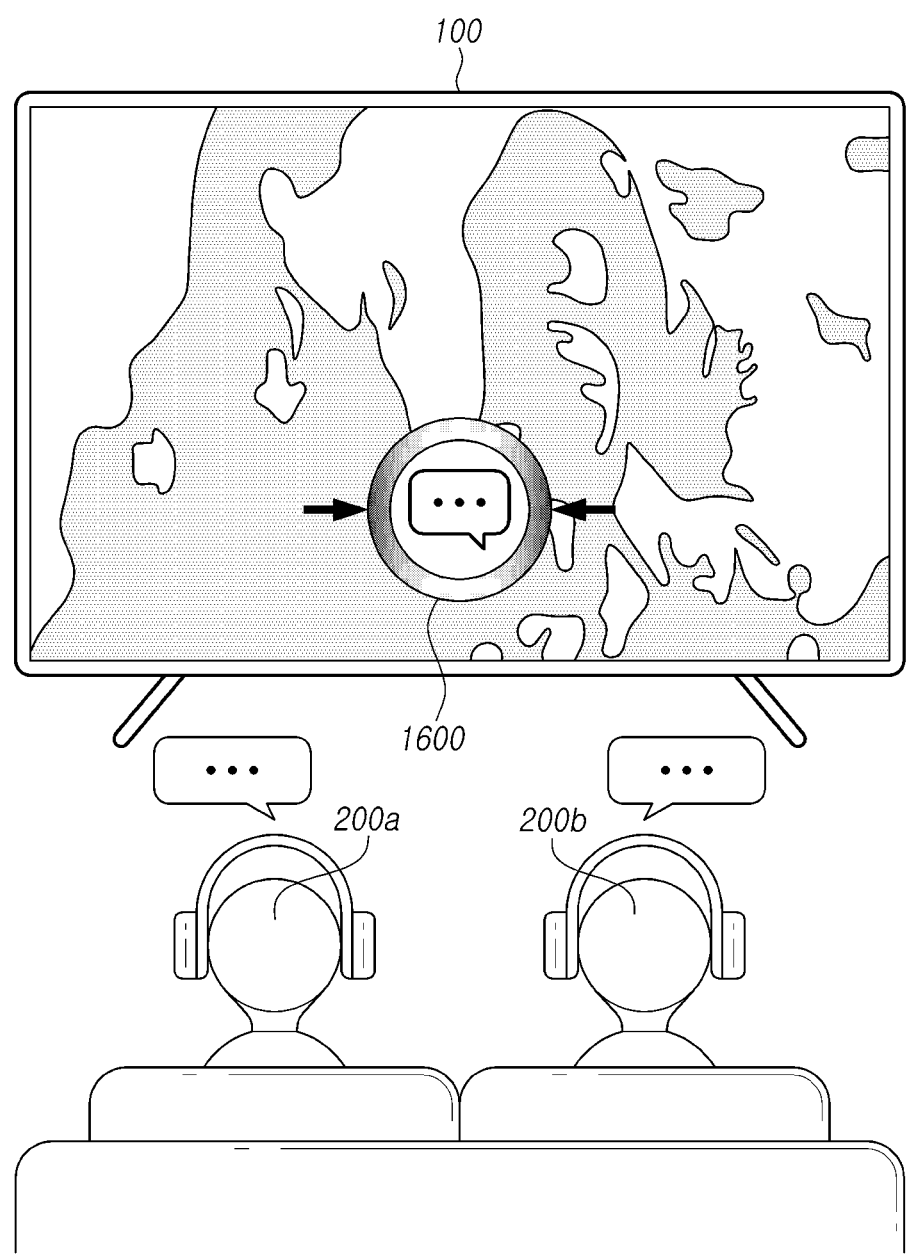

FIG. 16 illustrates a case in which an indicator 1600 is displayed on the content providing device 100 to indicate the device where an utterance is made by the users of the personal audio reproducing devices 200a and 200b on both sides as the conversation mode proceeds. As illustrated, the indicator 1600 includes a left-right arrow to indicate that utterances are made on the personal audio reproducing devices 200a and 200b on both sides.

Figure 17:
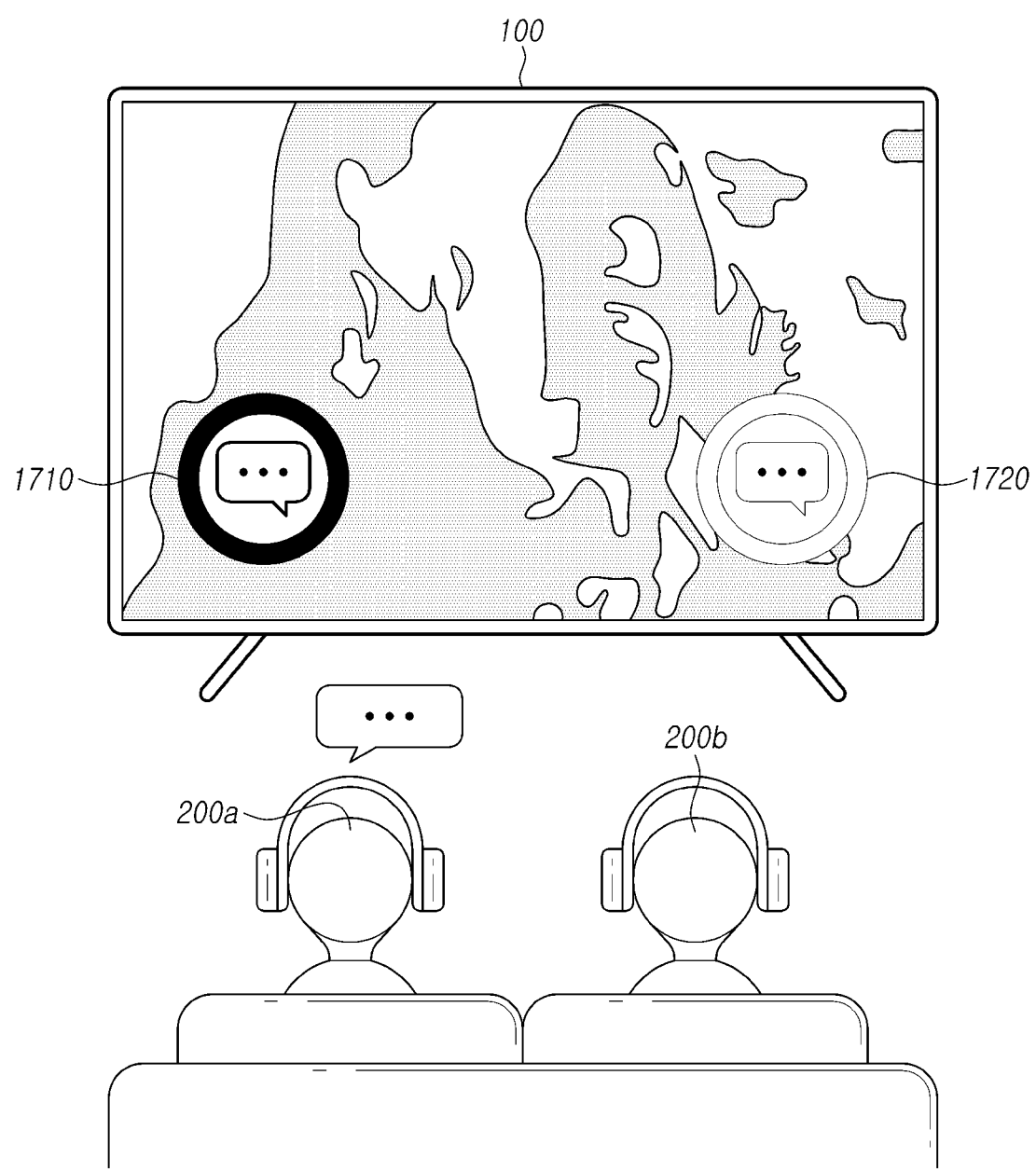
FIGS. 17 and 18 are views illustrating contexts in which an indicator indicating the progress of a conversation is displayed on a display of a content providing device when a conversation mode is performed between users through two personal audio reproducing devices each connected to a content providing device according to an embodiment of the disclosure.
Figure 18:
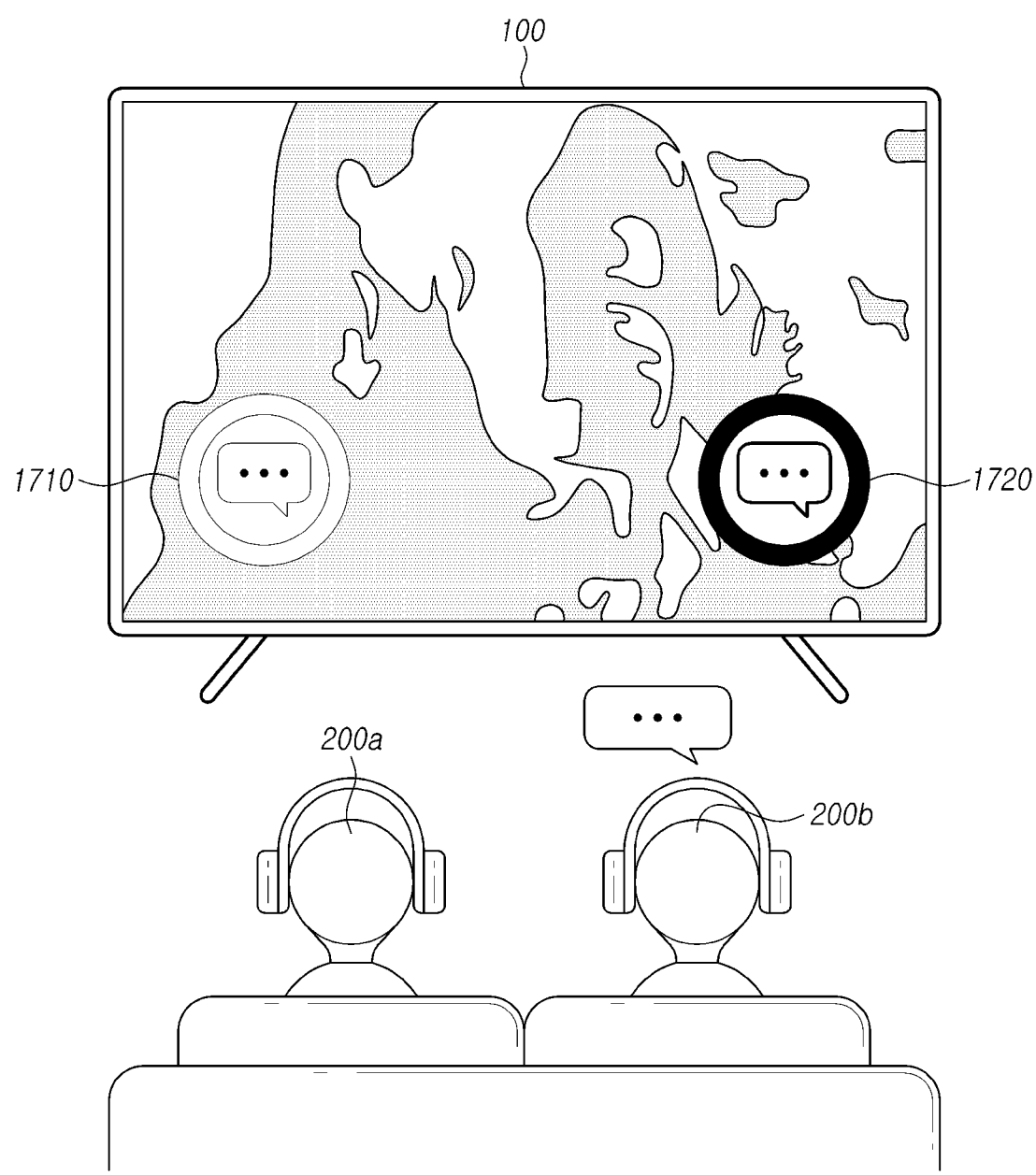

FIGS. 17 and 18 are views illustrating contexts in which an indicator indicating the progress of a conversation is displayed on a display of a content providing device when a conversation mode is performed between users through two personal audio reproducing devices each connected to a content providing device according to an embodiment of the disclosure.

Similar to FIGS. 13 to 16, FIGS. 17 and 18 illustrate a state in which users who view content through personal audio reproducing devices 200a and 200b respectively connected to the content providing device 100 enter a conversation mode from a simultaneous listening mode. Unlike only one indicator indicating the conversation mode displayed in FIGS. 13 to 16, in FIGS. 17 and 18, signs 1710 and 1720 indicating the personal audio reproducing devices 200a and 200b, respectively, are displayed at both lower ends of the display 170 of the content providing device 100. As described above, since the content providing device 100 may recognize the respective relative positions of the personal audio reproducing devices 200a and 200b being connected thereto, the indicator 1710 displayed on the lower left side of the display 170 may indicate the personal audio reproducing device 200a on the left side, and the indicator 1720 displayed on the lower right side of the display 170 may indicate the personal audio reproducing device 200b on the right side. In FIG. 17, an utterance is being made by the user of the personal audio reproducing device 200a, and the left indicator 1710 among the signs displayed on the content providing device 100 is displayed darkly. In FIG. 18, an utterance is being made by the user of the personal audio reproducing device 200b, and the right indicator 1720 among the signs displayed on the content providing device 100 is displayed darkly.

Figure 19:
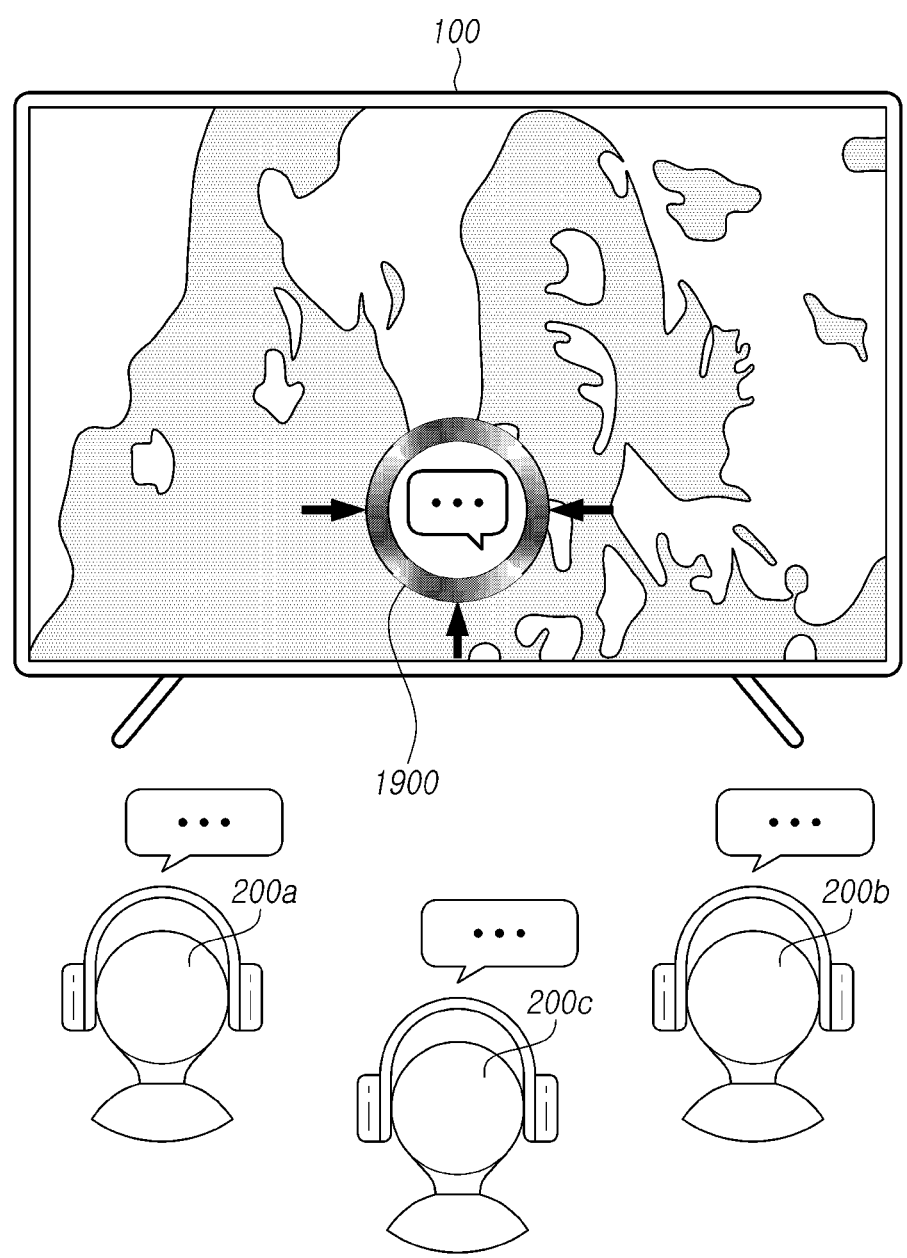

FIGS. 19 and 20 are views illustrating example contexts in which an indicator indicating the progress of a conversation between users is displayed on a display of a content providing device when a conversation mode is performed through three personal audio reproducing devices each connected to a content providing device according to an embodiment of the disclosure.

FIG. 19 illustrates a state in which users who view content through personal audio reproducing devices 200a, 200b, and 200c respectively connected to the content providing device 100 enter a conversation mode from a simultaneous listening mode. As illustrated, the content providing device 100 may be a TV device. In FIG. 19, an indicator 1900 indicating that the personal audio reproducing devices 200a, 200b, and 200c have entered the conversation mode is displayed on the display of the content providing device 100. The illustrated indicator 1900 is similar to the indicator 1600 illustrated in FIG. 16, but is different in that there are three connected personal audio reproducing devices. The content providing device 100 may recognize the respective relative positions of the personal audio reproducing devices 200a, 200b, and 200c. As illustrated, the left and right arrows among the arrows included in the indicator 1900 are for indicating the personal audio reproducing devices 200a and 200b located on the left and right sides, respectively, of the content providing device 100. As illustrated, the lower center arrow among the arrows included in the indicator 1900 is for indicating the personal audio reproducing device 200c located between the personal audio reproducing devices 200a and 200b. As illustrated, utterances are made on all three personal audio reproducing devices 200a, 200b, and 200c, and three arrows are displayed on the indicator 1900 to indicate this.

FIG. 20 illustrates a state in which users who view content through personal audio reproducing devices 200a, 200b, and 200c respectively connected to the content providing device 100 enter a conversation mode from a simultaneous listening mode. As illustrated, the content providing device 100 may be a TV device. In FIG. 20, an indicator 2000 indicating that the personal audio reproducing devices 200a, 200b, and 200c have entered the conversation mode is displayed on the display of the content providing device 100. The illustrated indicator 2000 is similar to the indicator 1900 illustrated in FIG. 19, but is different in that the name (or identifier) of each device is displayed under the indicator 2000 in FIG. 20, unlike FIG. 19 in which the arrow in each direction is used to indicate the speaker. As illustrated, an utterance is currently being made on the personal audio reproducing device 200c, and the identifier of the corresponding device may be Label 2. Label 2 is displayed under the indicator 2000.

Figure 21:
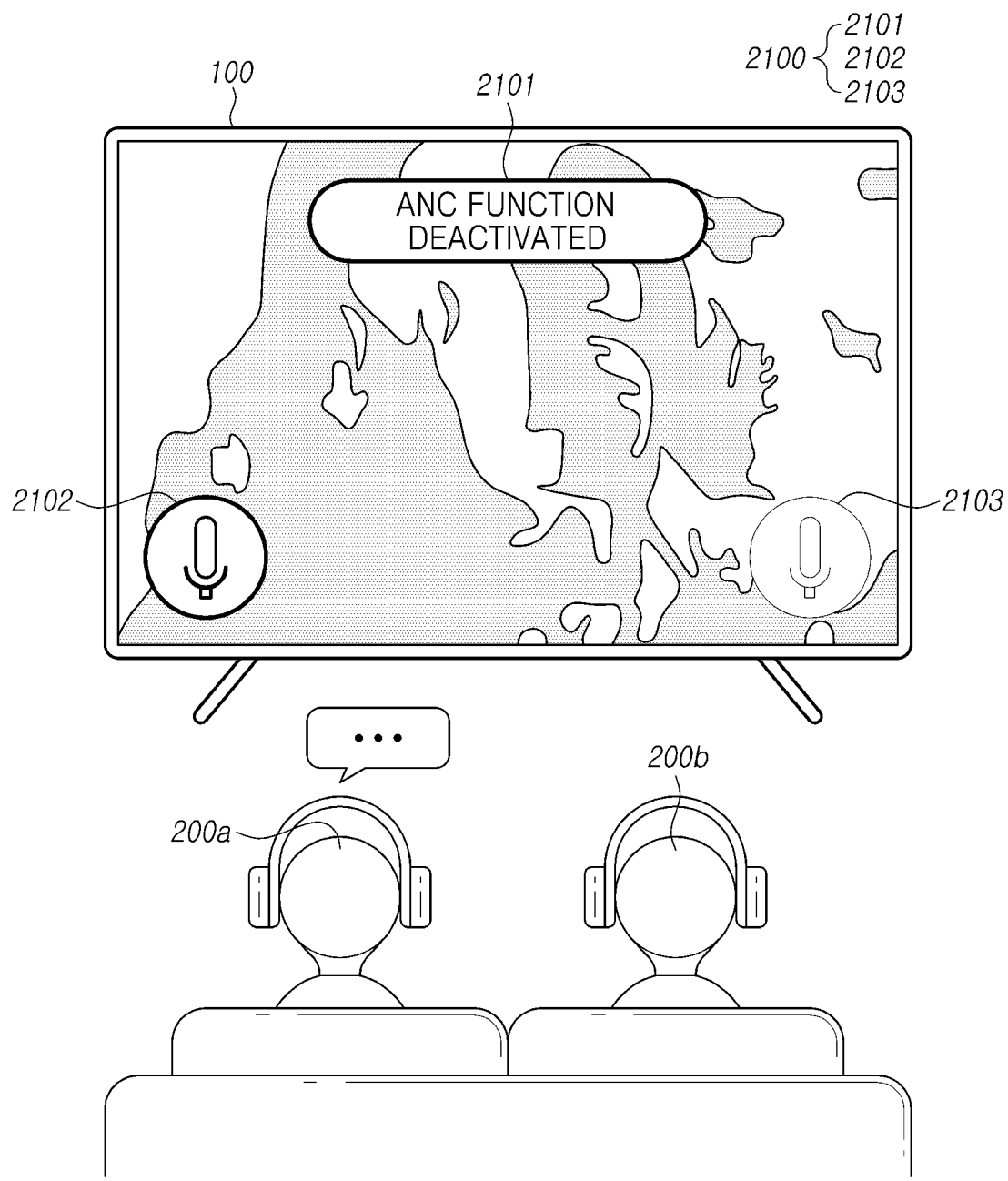
FIG. 21 is a view illustrating a context in which an indicator indicating the progress of a conversation between users is displayed on a display of a content providing device when a conversation mode is started between users through three personal audio reproducing devices each connected to a content providing device according to an embodiment of the disclosure.

FIG. 21 is a view illustrating a context in which an indicator indicating the progress of a conversation between users is displayed on a display of a content providing device when a conversation mode is started between users through two personal audio reproducing devices each connected to a content providing device according to an embodiment of the disclosure.

FIG. 21 illustrates a state in which users who view content through personal audio reproducing devices 200a and 200b respectively connected to the content providing device 100 enter a conversation mode from a simultaneous listening mode. In FIG. 21, an indicator 2100 indicating that the personal audio reproducing devices 200a and 200b have entered the conversation mode is displayed on the display 170 of the content providing device 100. The illustrated indicator 2100 is similar to the signs 1700 and 1800 illustrated in FIGS. 17 and 18, but there is a slight difference in that the description, e.g., ANC mode deactivated, of the sound output setting in the currently applied conversation mode is displayed (2101) at the top, and the shapes of the displays 2102 and 2103 indicating the personal audio reproducing devices 200a and 200b, respectively, are different.

The signs illustrated in FIGS. 13 to 21 are all exemplary, but the disclosure is not limited thereto. Various methods of displaying the progress of the conversation mode through the content providing device may be considered.

Figure 22:
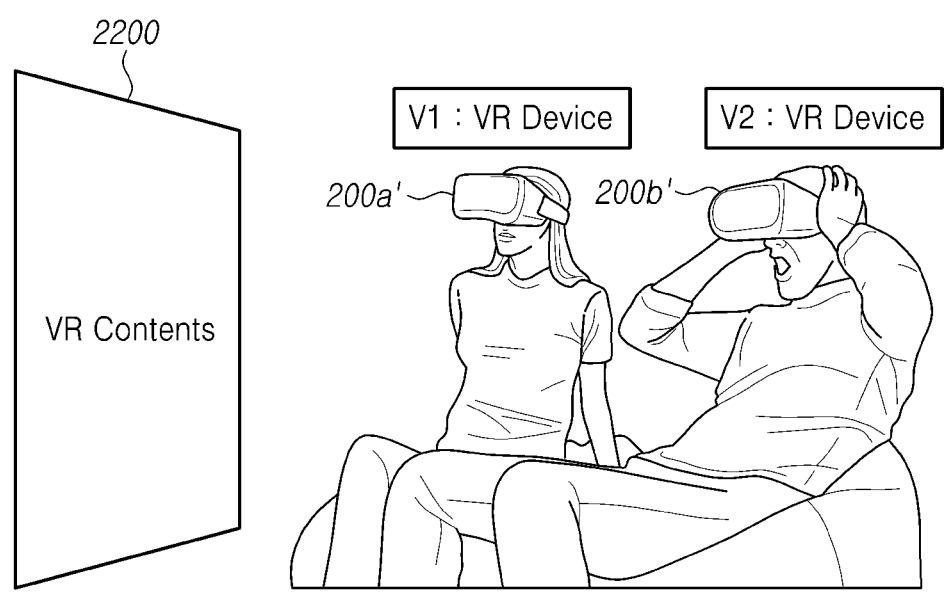
FIG. 22 is a view schematically illustrating an environment where a simultaneous listening mode and conversation mode may apply through a plurality of VR devices according to an embodiment of the disclosure.

FIG. 22 is a view schematically illustrating an environment where a simultaneous listening mode and conversation mode may apply through a plurality of VR devices according to an embodiment of the disclosure.

As illustrated, two users are enjoying immersive content while wearing the VR devices 200a' and 200b', respectively. The provided immersive content 2200 may be simultaneously streamed from the same or different content providing devices (not explicitly shown). The content providing device may be, e.g., any wired or wireless communication device or server device capable of providing immersive content, but is not limited to a specific form. In an embodiment, the two VR devices 200a' and 200b' may be connected to each other through a predetermined short-range wireless communication scheme, but the disclosure is not limited thereto. The VR devices 200a' and 200b' may enter the conversation mode in response to occurrence of the conversation mode request event in either device while viewing the content according to the sound output setting set for the simultaneous listening mode in the simultaneous listening mode. When entering the conversation mode, the sound output according to the sound output setting set for the conversation mode is heard. In an embodiment, the sound output through the speakers of the VR devices 200a' and 200b' in the conversation mode may include an immersive content sound and the sound corresponding to the user voice (obtained from the microphone on each device) overlaid thereon, but the disclosure is not limited thereto.

FIG. 23 is a view schematically illustrating a simultaneous listening environment by a plurality of users according to an embodiment of the disclosure.

FIG. 23 illustrates a simultaneous listening environment similar to that illustrated in FIG. 1. As illustrated, two personal audio reproducing devices 200a and 200b are wirelessly connected to the content providing device 100. However, unlike illustrated in FIG. 1, according to what is illustrated in FIG. 23, the audio signals obtained by the personal audio reproducing devices 200a and 200b from the same content providing device 100 are not the same content. Referring to FIG. 23, the user is watching different programs using the split mode of the content providing device 100 (e.g., a TV device), and the personal audio reproducing devices 200a and 200b also output different content sounds corresponding to the programs being watched and different from each other. Even in this context, when the above-described predetermined event for entering the conversation mode is detected, the content providing device 100 and the personal audio reproducing devices 200a and 200b may enter the conversation mode and obtain the respective content sounds (different from each other) according to the changed sound output setting for the conversation mode.

Figure 24A:
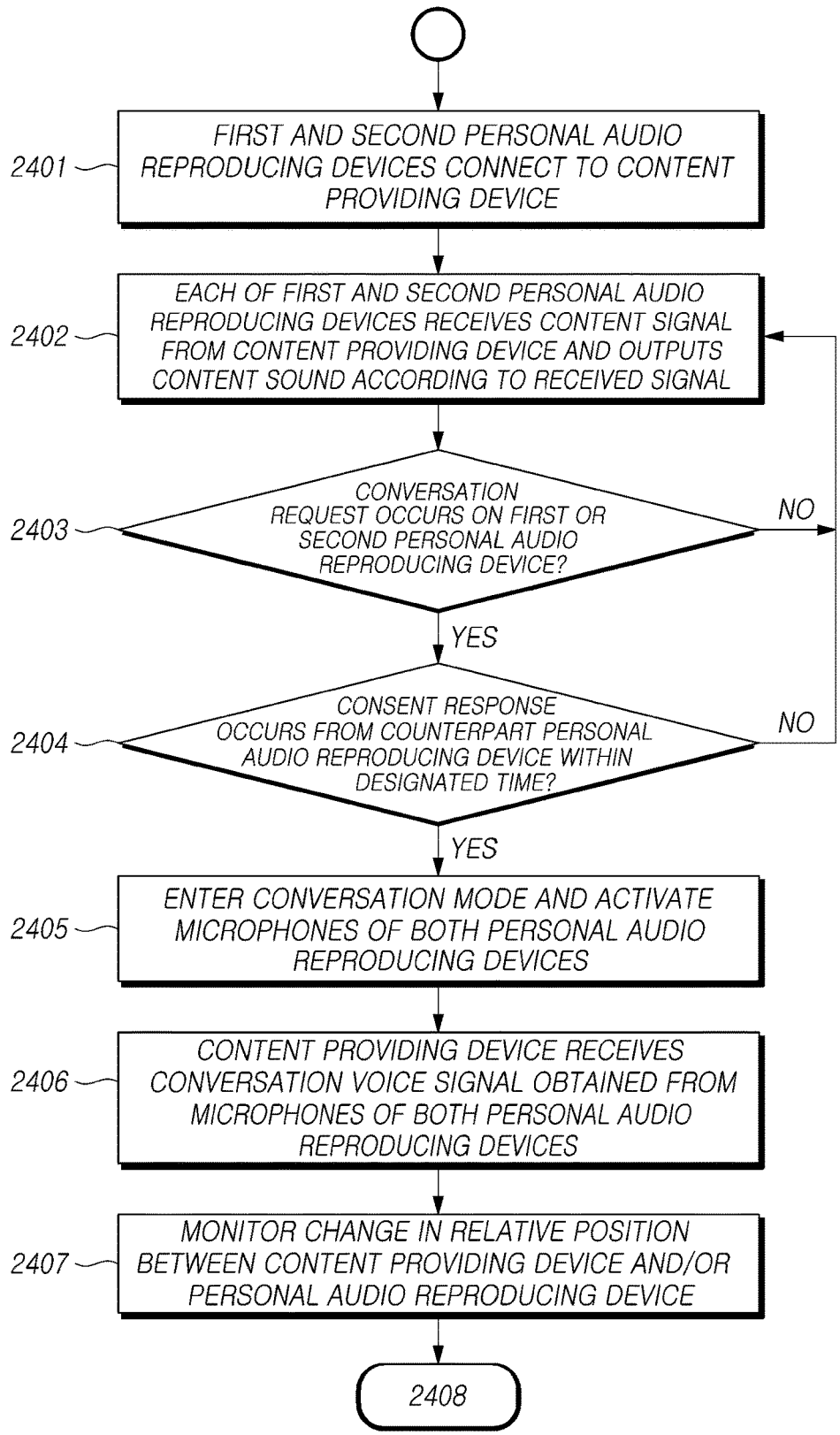
FIGS. 24A and 24B are flowcharts schematically illustrating operations of starting, performing, and ending a conversation mode when providing a sound according to a conversation voice when a conversation mode is performed, as a 3D sound generated/changed considering relative position changes between personal audio reproducing devices according to an embodiment of the disclosure.
Figure 24B:
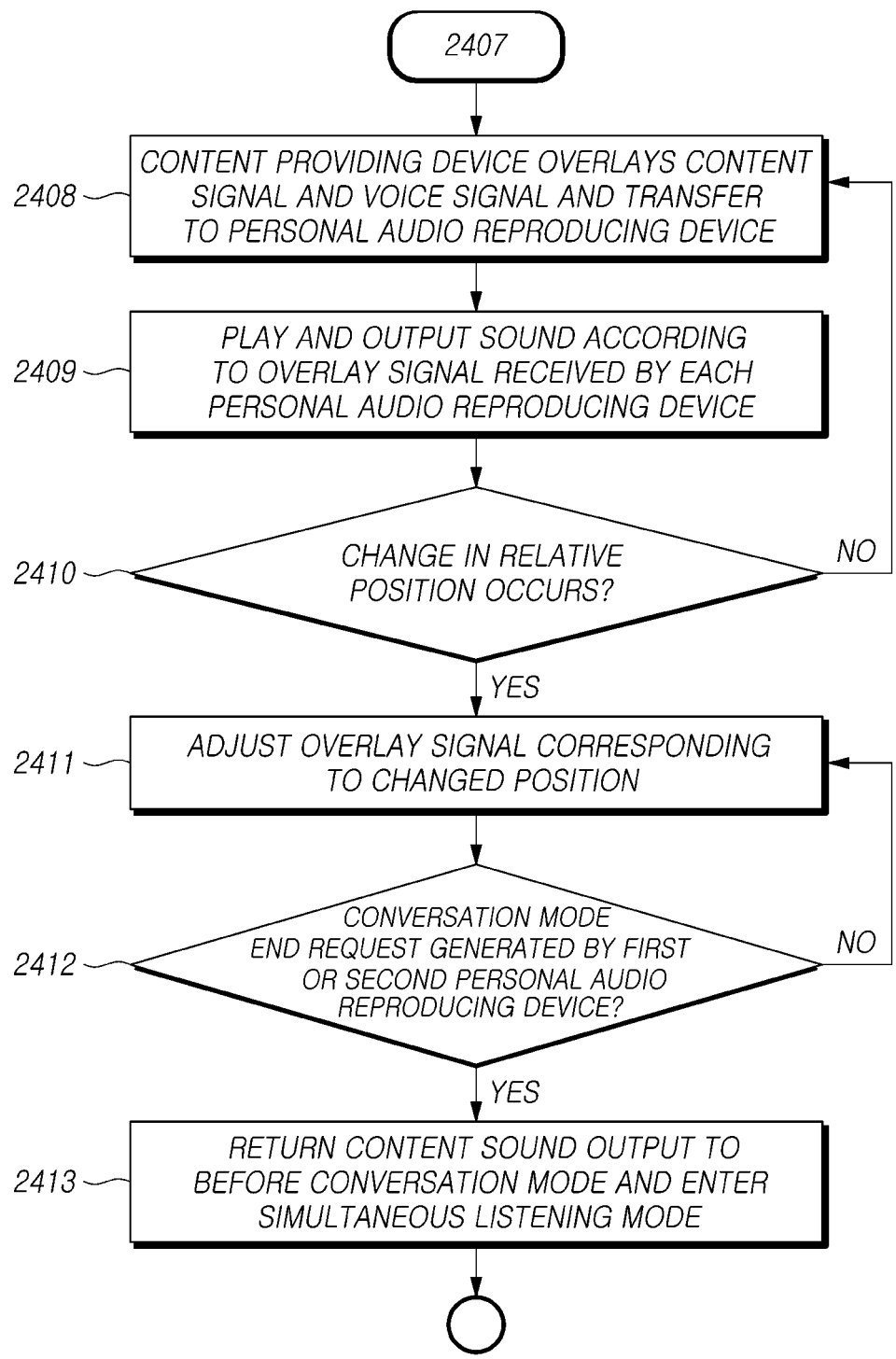

FIGS. 24A and 24B are flowcharts schematically illustrating operations of starting, performing, and ending a conversation mode when providing a sound according to a conversation voice when a conversation mode is performed, as a 3D sound generated/changed considering relative position changes between personal audio reproducing devices according to an embodiment of the disclosure.

According to an embodiment of the disclosure in connection with the drawings, when the plurality of personal audio reproducing devices connect to the content providing device and enter the conversation mode while viewing the content sound of the audio content in the simultaneous listening mode, the sound according to the user's uttered voice obtained through the microphone in each personal audio reproducing device may be overlaid with the content sound and provided through the speaker of each of the personal audio reproducing devices.

As illustrated, in operation 2401, the first and second personal audio reproducing devices may be communicatively connected to the content providing device. In operation 2402, each of the first and second personal audio reproducing devices may receive an audio content signal from the content providing device and may play and output content sound based on the received audio signal. In this case, the content sound may be generated and output according to the sound output setting for the simultaneous listening mode predetermined for each personal audio reproducing device.

Then, in operation 2403, it may be determined which one of the first and second personal audio reproducing devices has generated an event indicating a conversation request. If it is determined that such an event has occurred, the occurrence of the event may be transferred to the counterpart's personal audio reproducing device (e.g., another audio reproducing device in the simultaneous listening mode). In operation 2404, it may be determined whether the personal audio reproducing device in which the event has occurred has obtained a consent response from the counterpart personal audio reproducing device that has received the notification within a designated time. As described above, a plurality of events that may be used by each personal audio reproducing device to request the start of the conversation mode or to agree to the request of the other party may be predefined. According to an embodiment, as illustrated, when there is a request to start a conversation mode generated by one device and when there is consent from the counterpart device, the conversation mode may be entered, but the disclosure is not limited thereto.

When it is determined that the consent response is obtained from the counterpart personal audio reproducing device in operation 2404, the conversation mode may be entered, and operation 2405 is performed so that the respective microphones of both the personal audio reproducing devices may be activated. In operation 2406, the content providing device may receive the voice signal obtained from the microphone of each personal audio reproducing device.

In an embodiment, each personal audio reproducing device may sense the magnitude and direction of the motion of the corresponding device through sensors provided therein, e.g., an IMU sensor, a gyro sensor, a geomagnetic sensor, and various other motion sensors. In an embodiment, as described above, the content providing device and each of the personal audio reproducing devices may continuously obtain relative positions of each other through signal transmission/reception through a short-range wireless communication scheme. In operation 2407, the content providing device may monitor the relative positions between the content providing device and/or the personal audio reproducing device.

Referring to FIG. 24B, in operation 2408, the content providing device may overlay the content audio signal to be provided to each personal audio reproducing device and the voice signal from each personal audio reproducing device obtained in operation 2406, and may transmit the resultant signal to each personal audio reproducing device. In an embodiment, the content providing device may appropriately overlay the content audio signal and the voice signal, based on the sound output setting for the conversation mode, and then transmit the resultant signal to each personal audio reproducing device. In an embodiment, when the content providing device overlays the content audio signal and the voice signal to be transmitted to each personal audio reproducing device, the content providing device may use the result obtained by monitoring the relative position of the content providing device and/or the personal audio reproducing device in operation 2407. For example, when the content processing device overlays the content audio signal and the voice signal to be transmitted to each personal audio reproducing device, the content processing device may generate a 3D sound signal reflecting the relative positions of the counterpart personal audio reproducing device and the content providing device for the corresponding personal audio reproducing device.

In operation 2409, each personal audio reproducing device may receive the signal in which the content audio signal and the voice signal are overlaid from the content providing device, and may play and output sound based on the received signal. In operation 2410, the content providing device may determine whether a change has occurred in the relative positions of the content providing device and/or the personal audio reproducing device. When such a change occurs, in operation 2411, the content providing device may adjust the overlay signal of the content audio signal and the voice signal by reflecting the changed relative position. Thus, a 3D sound in which the content sound and the conversation sound are overlaid, and the change in position between the content providing device and/or personal audio reproducing device is reflected may be provided to the user through each personal audio reproducing device during the conversation mode. Therefore, the user may enjoy content while having a conversation in a more natural manner as if she does so without the device when listening to the sound through the speaker of the personal audio reproducing device.

Figure 25:
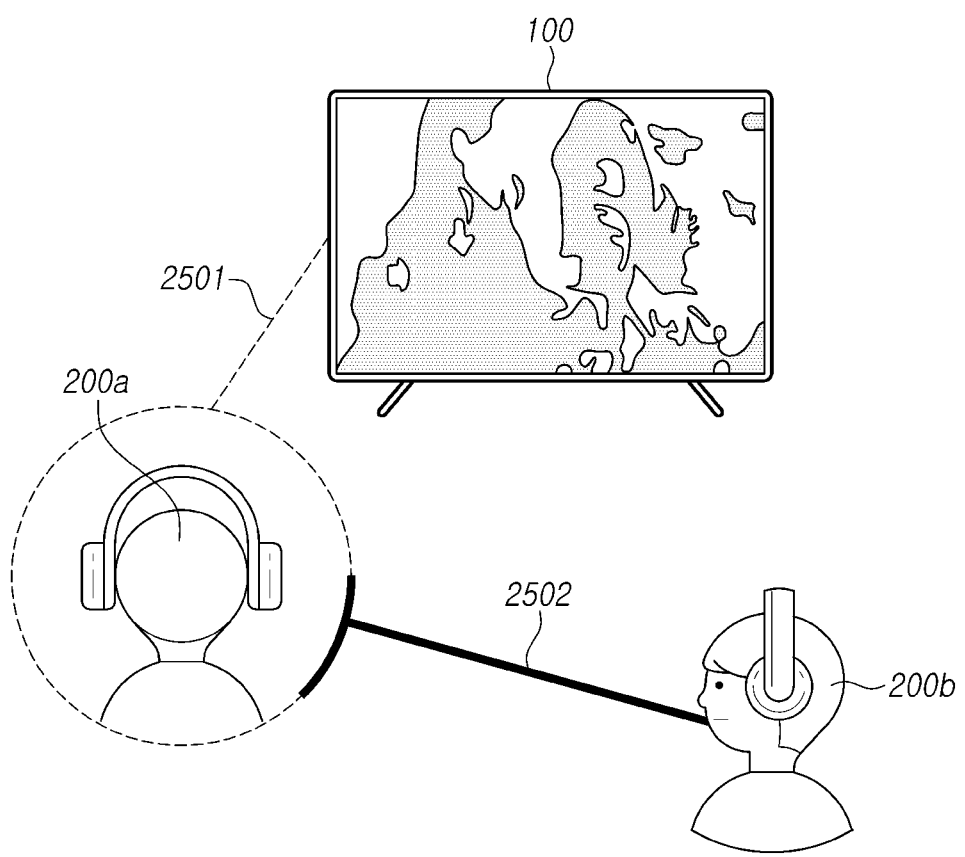
FIG. 25 is a view visually illustrating a context in which a 3D sound reflecting relative positions of a personal audio reproducing device where an utterance occurs and a content providing device is provided for a personal audio reproducing device when a conversation mode is performed according to an embodiment of the disclosure.

FIG. 25 is a view visually illustrating a context in which a 3D sound reflecting relative positions of a personal audio reproducing device where an utterance occurs and a content providing device is provided for a personal audio reproducing device when a conversation mode is performed according to an embodiment of the disclosure.

As illustrated, the audio content signal from the content providing device 100 and the user's uttered voice signal generated on the personal audio reproducing device 200*b* are provided to the personal audio reproducing device 200*a*. The dashed line 2501 denotes the content sound according to the content signal from the content providing device 100, and the thick solid line 2502 denotes the conversation sound according to the voice signal from the personal audio reproducing device 200*b* being uttered in the conversation. The content sound displayed by the dashed line 2501 may be a directional sound reflecting the position of the content providing device 100 relative to the personal audio reproducing device 200*a*. The conversation sound shown in the solid line 2502 may be a directional sound reflecting the position of the personal audio reproducing device 200*b* relative to the personal audio reproducing device 200*a*.

Referring back to FIG. 24, in operation 2412, it may be determined which one of the first and second personal audio reproducing devices has generated an event indicating a conversation mode end request. When it is determined that such an event has occurred, in operation 2412, the content providing device may return the content playback time point to the time point before entering the conversation mode and may enter the simultaneous listening mode again.

Although it has been described with reference to FIGS. 24 and 25 as if the content providing device leads synthesis and processing of the content audio signal and conversation sound signal to be transferred to each personal audio reproducing device, and generation of a 3D sound signal according to the relative positions between the content providing device and/or personal audio reproducing devices in the conversation mode between the personal audio reproducing devices, the disclosure is not limited thereto. According to an embodiment of the disclosure, the personal audio reproducing device may lead all or some of the above-described processes instead of the content providing device. According to an embodiment of the disclosure, a separate personal communication device connected to the personal audio reproducing device may perform all or some of the processes.

Although the description herein focuses primarily on the conversation mode between a plurality of personal audio reproducing devices connected to the same content providing device, the disclosure is not limited thereto. In an embodiment of the disclosure, as long as positioned in a space where they are positioned close to each other, personal audio reproducing devices respectively connected to content providing devices to enjoy audio content may also be regarded as performing the simultaneous listening mode and, when a predetermined event occurs, the conversation mode may be established between the personal audio reproducing devices.

According to the disclosure, a method for controlling a sound output of an audio reproducing device 200*a*, 200*b*, or 200 is provided. The audio reproducing device is operable in a simultaneous listening mode with another audio reproducing device, and in the simultaneous listening mode. Each of the audio reproducing device and the other audio reproducing device may operate to output a content sound based on an audio content signal streamed from a corresponding content providing device 100 through communication connection according to their respective sound output setting. The method comprises detecting a conversation request generated from the other audio reproducing device while the audio reproducing device and the other audio reproducing device operate in the simultaneous listening mode. The method comprises allowing the audio reproducing device to exit the simultaneous listening mode and enter a conversation mode and change the sound output setting of the audio reproducing device in response to detecting the conversation request. The method comprises controlling the audio reproducing device to output the content sound based on the changed sound output setting while operating in the conversation mode.

In an embodiment, in the simultaneous listening mode, the sound output setting of the audio reproducing device may include a setting to turn on an active noise cancellation (ANC) function. In the conversation mode, the changed sound output setting may include a setting to turn off the ANC function.

In an embodiment, the audio reproducing device may include a microphone configured to obtain external noise. The changed sound output setting may include a setting to turn on a transparency mode to output a noise sound based on the external noise along with the content sound.

In an embodiment, the sound output setting of the audio reproducing device may include at least one of a 3D sound effect setting and a volume setting for the content sound. The changed sound output setting may include a changed setting of at least one of the 3D sound effect setting and the volume setting.

In an embodiment, the method may further comprise detecting a conversation request to the other audio reproducing device, generated on the audio reproducing device while the audio reproducing device and the other audio reproducing device operate in the simultaneous listening mode, allowing the audio reproducing device to exit the simultaneous listening mode and enter the conversation mode and change the sound output setting of the audio reproducing device in response to detecting the conversation request to the other audio reproducing device, and controlling the audio reproducing device to output the content sound based on the changed sound output setting while operating in the conversation mode.

In an embodiment, detecting the conversation request to the other audio reproducing device may include detecting at least one of a predetermined touch input by a user, a predetermined button input or input release, a predetermined key input or input release, a voice input having a threshold value or more, a motion having a threshold value or more, and a motion having a predetermined pattern, generated on the audio reproducing device.

In an embodiment, detecting the conversation request to the other audio reproducing device may include detecting a change in a distance or angle between the audio reproducing device and the other audio reproducing device, meeting a predetermined criterion.

In an embodiment, the method may further comprise providing a signal to indicate generation of the conversation request to the other audio reproducing device to the content providing device or the other audio reproducing device through communication connection when detecting the conversation request to the other audio reproducing device, generated on the audio reproducing device.

In an embodiment, the audio reproducing device may include a microphone configured to obtain a voice input from a user. The method may further comprise controlling to transmit the voice input obtained through the microphone from the audio reproducing device to the content providing device or the other audio reproducing device while operating in the conversation mode.

In an embodiment, the other audio reproducing device may include a second microphone configured to obtain a voice input from a second user. The method may further comprise controlling the audio reproducing device to output a conversation sound based on the voice input obtained from the other audio reproducing device, overlaid on the content sound, based on the changed sound output setting while operating in the conversation mode.

In an embodiment, the method may further comprise detecting respective positions of the content providing device and the other audio reproducing device, relative to the audio reproducing device. The changed sound output setting may include a 3D sound effect setting of the conversation sound and the content sound based on the detected relative positions.

In an embodiment, the method may further comprise detecting a request for ending the conversation mode, generated on the audio reproducing device or the other audio reproducing device while operating in the conversation mode. The method may further comprise, when detecting the end request, allowing the audio reproducing device to exit the conversation mode and enter the simultaneous listening mode and restoring the changed sound output setting back to the sound output setting before the change and controlling the audio reproducing device to output the content sound based on the restored sound output setting in the simultaneous listening mode.

In an embodiment, detecting the request for ending the conversation mode may include detecting at least one of a predetermined touch input, a predetermined button input or input release, a predetermined key input or input release, absence of a voice input having a threshold value or more during a predetermined period or longer, absence of a motion having a threshold value or more during a predetermined period or longer, and a motion having a predetermined pattern, generated on the audio reproducing device or the other audio reproducing device.

According to the disclosure, an electronic device 100, 200, 600*a*, or 600*b* is provided. The electronic device may include a memory 130 or 220 storing at least one instruction and at least one processor 140 or 230 electrically connected to the memory 130 or 220 and executing the at least one instruction. The at least one processor 140 or 230 may be configured to perform any one of the above-described methods.

In an embodiment, the electronic device may further comprise an audio processing circuit 150 providing an audio content signal according to a timeline, a display 170, and a communication circuit 110 configured to establish a communication connection to each of the audio reproducing device and the other audio reproducing device and transmit the audio content signal from the audio processing circuit 150 to each of the audio reproducing device and the other audio reproducing device through the communication connection. Each of the audio processing circuit 150, the display 170, and the communication circuit 110 may be connected to the processor 140. The processor 140 may be configured to detect a conversation request to the other audio reproducing device, generated from the audio reproducing device, while transmitting the audio content signal to each of the audio reproducing device and the other audio reproducing device through the communication circuit 110 and, when detecting the conversation request, display an indicator 1300, 1400, 1500, 1600, 1710, 1720, 1900, 2000, or 2100 indicating a conversation state between the audio reproducing device and the other audio reproducing device through the display 170.

In an embodiment, the indicator indicating the conversation state may include an icon 1710, 1720, 2102, or 2103 representing each of the audio reproducing device and the other audio reproducing device.

In an embodiment, the indicator indicating the conversation state may include an indication 1400, 1500, 1600, 1710, 1720, 1900, 2000, or 2102 one which an utterance input is currently generated between the audio reproducing device and the other audio reproducing device.

In an embodiment, the processor 140 may be further configured to store corresponding timeline information regarding the audio content signal when detecting the conversation request, detect an end of conversation between the audio reproducing device and the other audio reproducing device generated by the conversation request, and when detecting the end of the conversation, allow the audio processing circuit 150 to move a time of providing the audio content signal on the timeline based on the stored timeline information.

In an embodiment, the processor 140 may be further configured to, when detecting the end of the conversation, display a selection option 700 indicating whether to move the time of providing the audio content signal on the timeline based on the stored timeline information through the display 170 and allow the audio processing circuit 150 to move the time of providing the audio content signal on the timeline based on the stored timeline information in response to selection on the selection option.

In an embodiment, the audio content signal transmitted to each of the audio reproducing device and the other audio reproducing device through the communication circuit 110 may include different content information.

It should be appreciated that various embodiments of the disclosure and the terms used therein are not intended to limit the technological features set forth herein to particular embodiments and include various changes, equivalents, or replacements for a corresponding embodiment. As used herein, the singular forms "a," "an," and "the" are intended to include the plural forms as well, unless the context clearly indicates otherwise. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

As used herein, the term "part" or "module" may include a unit implemented in hardware, software, or firmware, and may interchangeably be used with other terms, for example, "logic," "logic block," "part," or "circuitry". A part or module may be a single integral component, or a minimum unit or part thereof, adapted to perform one or more functions. For example, according to an embodiment, 'part' or 'module' may be implemented in a form of an application-specific integrated circuit (ASIC).

As used in various embodiments of the disclosure, the term "if" may be interpreted as "when," "upon," "in response to determining," or "in response to detecting," depending on the context. Similarly, "if A is determined" or "if A is detected" may be interpreted as "upon determining A" or "in response to determining A", or "upon detecting A" or "in response to detecting A", depending on the context.

The program executed by the content providing device 100, the personal communication device 600a or 600b, or the personal audio reproducing device 200 described herein may be implemented as a hardware component, a software component, and/or a combination thereof. The program may be executed by any system capable of executing computer readable instructions.

The software may include computer programs, codes, instructions, or combinations of one or more thereof and may configure the processing device as it is operated as desired or may instruct the processing device independently or collectively. The software may be implemented as a computer program including instructions stored in computer-readable storage media. The computer-readable storage media may include, e.g., magnetic storage media (e.g., read-only memory (ROM), random-access memory (RAM), floppy disk, hard disk, etc.) and an optically readable media (e.g., CD-ROM or digital versatile disc (DVD). Further, the computer-readable storage media may be distributed to computer systems connected via a network, and computer-readable codes may be stored and executed in a distributed manner. The computer program may be distributed (e.g., downloaded or uploaded) via an application store (e.g., Play Store™), directly between two UEs (e.g., smartphones), or online. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A method of controlling a sound output of a first audio reproducing device, the first audio reproducing device being operable in a simultaneous listening mode with a second audio reproducing device such that, in the simultaneous listening mode, each of the first audio reproducing device and the second audio reproducing device operate to output a content sound based on an audio content signal streamed from a corresponding content providing device through a communication connection, according to their respective sound output settings, the method comprising:
   detecting a conversation request generated from the second audio reproducing device while the first audio reproducing device and the second audio reproducing device operate in the simultaneous listening mode;
   in response to detecting the conversation request, controlling the first audio reproducing device to exit the simultaneous listening mode, enter a conversation mode while the second audio reproducing device enters the conversation mode, and change the sound output setting of the first audio reproducing device;
   controlling the first audio reproducing device to output the content sound based on the changed sound output setting while operating in the conversation mode; and
   controlling the first audio reproducing device to remain in the conversation mode while the second audio reproducing device remains in the conversation mode outputting the changed sound output setting.

2. The method of claim 1, wherein
   in the simultaneous listening mode, the sound output setting of the first audio reproducing device includes a setting to turn on an active noise cancellation (ANC) function, and
   in the conversation mode, the changed sound output setting includes a setting to turn off the ANC function.

3. The method of claim 1, wherein
   the first audio reproducing device includes a microphone configured to obtain external noise, and
   the changed sound output setting includes a setting to turn on a transparency mode to output a noise sound based on the obtained external noise along with the content sound.

4. The method of claim 1, wherein
   the sound output setting of the first audio reproducing device includes at least one of a 3D sound effect setting and a volume setting for the content sound, and
   the changed sound output setting includes a changed setting of at least one of the 3D sound effect setting and the volume setting.

5. The method of claim 1, further comprising:
detecting a conversation request generated on the first audio reproducing device for the second audio reproducing device while the first audio reproducing device and the second audio reproducing device operate in the simultaneous listening mode;
controlling the first audio reproducing device to exit the simultaneous listening mode, enter the conversation mode, and change the sound output setting of the first audio reproducing device, in response to detecting the conversation request generated on the first audio reproducing device; and
controlling the first audio reproducing device to output the content sound based on the changed sound output setting while operating in the conversation mode.

6. The method of claim 5, wherein
detecting the conversation request generated on the first audio reproducing device includes detecting at least one of a predetermined touch input by a user, a predetermined button input or predetermined button input release, a predetermined key input or predetermined key input release, a voice input having a threshold value or more, a motion having a threshold value or more, and a motion having a predetermined pattern, generated on the first audio reproducing device.

7. The method of claim 5, wherein
detecting the conversation request generated on the first audio reproducing device includes detecting a change in a distance or angle between the first audio reproducing device and the second audio reproducing device.

8. The method of claim 5, further comprising:
when detecting the conversation request generated on the first audio reproducing device, providing a signal to indicate generation of the conversation request generated on the first audio reproducing device to the content providing device or the second audio reproducing device through the communication connection.

9. The method of claim 1, wherein
the first audio reproducing device includes a microphone configured to obtain a voice input from a user, and
the method further comprises:
controlling the first audio reproducing device to transmit the voice input obtained through the microphone to the content providing device or the second audio reproducing device while operating in the conversation mode.

10. The method of claim 1, wherein
the second audio reproducing device includes a microphone configured to obtain a voice input from a second user, and
the method further comprises:
controlling the first audio reproducing device to output a conversation sound based on the voice input obtained from the second audio reproducing device, overlaid on the content sound, based on the changed sound output setting while operating in the conversation mode.

11. The method of claim 10, further comprising:
detecting respective positions of the content providing device and the second audio reproducing device, relative to the first audio reproducing device,
wherein the changed sound output setting includes a three-dimensional (3D) sound effect setting of the conversation sound and the content sound based on the detected relative positions.

12. The method of claim 1, further comprising:
detecting a request to end the conversation mode, generated on the first audio reproducing device or the second audio reproducing device, while operating in the conversation mode;
when detecting the request to end the conversation mode, controlling the first audio reproducing device to exit the conversation mode and enter the simultaneous listening mode and restoring the sound output setting set prior to entering the conversation mode; and
controlling the first audio reproducing device to output the content sound based on the restored sound output setting in the simultaneous listening mode.

13. The method of claim 12, wherein
detecting the request to end the conversation mode includes detecting at least one of a predetermined touch input, a predetermined button input or predetermined button input release, a predetermined key input or predetermined key input release, absence of a voice input having a threshold value or more during a predetermined period or longer, absence of a motion having a threshold value or more during a predetermined period or longer, and a motion having a predetermined pattern, generated on the first audio reproducing device or the second audio reproducing device.

14. An electronic device, comprising:
a memory storing at least one instruction; and
at least one processor electrically connected to the memory and executing the at least one instruction,
wherein the at least one processor is configured to perform the method of claim 1.

15. The electronic device of claim 14, further comprising:
an audio processing circuit providing an audio content signal according to a timeline;
a display; and
a communication circuit configured to establish the communication connection to each of the first audio reproducing device and the second audio reproducing device and transmit the audio content signal from the audio processing circuit to each of the first audio reproducing device and the second audio reproducing device through the communication connection,
wherein each of the audio processing circuit, the display, and the communication circuit is connected to the processor, and
the processor is configured to:
detect a conversation request generated on the first audio reproducing device for the second audio reproducing device, while transmitting the audio content signal to each of the first audio reproducing device and the second audio reproducing device through the communication circuit, and
when detecting the conversation request, control the display to display an indicator indicating a conversation state between the first audio reproducing device and the second audio reproducing device.

16. The electronic device of claim 15, wherein
the indicator indicating the conversation state includes an icon representing each of the first audio reproducing device and the second audio reproducing device.

17. The electronic device of claim 15, wherein
the indicator indicating the conversation state includes an indication on which of the first audio reproducing device and the second audio reproducing device an utterance input is currently generated.

18. The electronic device of claim 15, wherein the processor is configured to:
store corresponding timeline information regarding the audio content signal when detecting the conversation request,
detect an end of the conversation mode, and
when detecting the end of the conversation, control the audio processing circuit to move a time of providing the audio content signal on the timeline based on the stored timeline information.

19. The electronic device of claim 18, wherein the processor is configured to:
when detecting the end of the conversation mode, control the display to display a selection option indicating whether to move the time of providing the audio content signal on the timeline based on the stored timeline information; and
control the audio processing circuit to move the time of providing the audio content signal on the timeline based on the stored timeline information in response to the selection option being selected.

20. The electronic device of claim 15, wherein the audio content signal transmitted to the first audio reproducing device and the second audio reproducing device through the communication circuit includes different content information.

* * * * *